US011637318B2

(12) United States Patent
Wild et al.

(10) Patent No.: US 11,637,318 B2
(45) Date of Patent: Apr. 25, 2023

(54) SOLID ELECTROLYTE FOR ORGANIC BATTERIES

(71) Applicant: InnovationLab GmbH, Heidelberg (DE)

(72) Inventors: Andreas Wild, Haltern am See (DE); Michael Korell, Bochum (DE); Simon Münch, Jena (DE); Alexandra Lex-Balducci, Jena (DE); Johannes Brendel, Nuremberg (DE); Ulrich Sigmar Schubert, Jena (DE)

(73) Assignee: InnovationLab GmbH, Heidelberg (DE)

( * ) Notice: Subject to any disclaimer, the term of this patent is extended or adjusted under 35 U.S.C. 154(b) by 0 days.

(21) Appl. No.: 17/414,053

(22) PCT Filed: Nov. 7, 2019

(86) PCT No.: PCT/EP2019/080452
§ 371 (c)(1),
(2) Date: Jun. 15, 2021

(87) PCT Pub. No.: WO2020/126200
PCT Pub. Date: Jun. 25, 2020

(65) Prior Publication Data
US 2022/0045361 A1    Feb. 10, 2022

(30) Foreign Application Priority Data

Dec. 17, 2018  (EP) .................................... 18212868

(51) Int. Cl.
*H01M 10/0565* (2010.01)
*C08F 220/18* (2006.01)

(52) U.S. Cl.
CPC ... *H01M 10/0565* (2013.01); *C08F 220/1806* (2020.02); *C08F 2800/10* (2013.01); *H01M 2300/0082* (2013.01); *H01M 2300/0085* (2013.01)

(58) Field of Classification Search
CPC ..... H01M 10/0565; H01M 2300/0082; H01M 2300/0085; C08F 220/1806; C08F 2800/10
See application file for complete search history.

(56) References Cited

U.S. PATENT DOCUMENTS

| 6,066,410 | A | 5/2000 | Auer et al. |
| 7,438,895 | B2 | 10/2008 | Gallis |
| 7,960,061 | B2 | 6/2011 | Jost et al. |
| 8,173,305 | B2 | 5/2012 | Holzapfel et al. |
| 9,214,659 | B2 | 12/2015 | Hörpel et al. |
| 9,276,292 | B1 | 3/2016 | MacKenzie et al. |
| 9,397,341 | B2 | 7/2016 | Lockett et al. |
| 9,520,598 | B2 | 12/2016 | Lockett et al. |
| 9,890,230 | B2 | 2/2018 | Haeupler et al. |
| 10,103,384 | B2 | 10/2018 | Haeupler et al. |
| 10,263,280 | B2 | 4/2019 | Haeupler et al. |
| 10,608,255 | B2 | 3/2020 | Wild et al. |
| 10,756,348 | B2 | 8/2020 | Schubert et al. |
| 10,844,145 | B2 | 11/2020 | Meier et al. |
| 10,957,907 | B2 | 3/2021 | Schubert et al. |
| 2004/0115529 | A1 | 6/2004 | Nakahara et al. |
| 2007/0020525 | A1* | 1/2007 | Kim ..................... H01M 50/449 429/251 |
| 2007/0212615 | A1 | 9/2007 | Jost et al. |
| 2008/0138700 | A1 | 6/2008 | Horpel et al. |
| 2008/0160052 | A1 | 7/2008 | Gallis |
| 2008/0160053 | A1 | 7/2008 | McGill et al. |
| 2008/0319149 | A1* | 12/2008 | Fujimoto ............ H01M 10/052 526/265 |
| 2010/0084600 | A1* | 4/2010 | Ahmad ................ G02F 1/1525 252/62.2 |
| 2010/0183917 | A1 | 7/2010 | Holzapfel et al. |
| 2010/0304225 | A1 | 12/2010 | Pascaly et al. |
| 2012/0169297 | A1 | 7/2012 | Schaefer et al. |
| 2013/0323584 | A1 | 12/2013 | Schaefer et al. |
| 2015/0155594 | A1* | 6/2015 | Lee ..................... H01M 10/052 521/38 |
| 2016/0064712 | A1 | 3/2016 | Hoerpel et al. |

(Continued)

FOREIGN PATENT DOCUMENTS

| EP | 3 279 223 | 2/2018 |
| WO | 2013/017216 | 2/2013 |

(Continued)

OTHER PUBLICATIONS

Baibarac et al., "*Poly(N-vinyl carbazole) and carbon nanotubes based composites and their application to rechargeable lithium batteries*", Composites Science and Technology, vol. 67, 2007, pp. 2556-2563.
Chen et al., "*Naphthalene-based Polyimide Derivatives as Organic Electrode Materials for Lithium-ion Batteries*", Electrochimica Acta, vol. 229, 2017, pp. 387-395.
Choi et al., "*All-inkjet-printed, solid-state flexible supercapacitors on paper*", Energy & Environmental Science, vol. 9, 2016, pp. 2812-2821.
Huang et al., "*Quasi-Solid-State Rechargeable Lithium-Ion Batteries with a Calix[4]quinone Cathode and Gel Polymer Electrolyte*", Angew. Chem. Int. Ed., vol. 52, 2013, pp. 9162-9166.
Kim et al., "*Rechargeable Organic Radical Battery with Electrospun, Fibrous Membrane-Based Polymer Electrolyte*", Journal of The Electrochemical Society, vol. 154, Issue 9, 2007, pp. A839-A843.

(Continued)

*Primary Examiner* — Sarah A. Slifka
*Assistant Examiner* — Rachel L Zhang
(74) *Attorney, Agent, or Firm* — Grüneberg and Myers PLLC

(57) ABSTRACT

A process can be used to produce a charge storage unit, especially a secondary battery, the electrodes of which contain an organic redox-active polymer, and which includes a polymeric solid electrolyte. The solid electrolyte is obtained by polymerizing from mixtures of acrylates with methacrylates in the presence of at least one ionic liquid, which imparts advantageous properties to the charge storage unit.

20 Claims, No Drawings

(56) References Cited

U.S. PATENT DOCUMENTS

| | | | |
|---|---|---|---|
| 2016/0064773 A1* | 3/2016 | Choi | H01M 10/052 |
| | | | 429/313 |
| 2016/0208030 A1* | 7/2016 | Gavvalapalli | H01M 8/20 |
| 2016/0233509 A1 | 8/2016 | Haeupler et al. | |
| 2017/0058062 A1 | 3/2017 | Schubert et al. | |
| 2017/0062825 A1 | 3/2017 | Schubert et al. | |
| 2017/0114162 A1 | 4/2017 | Haeupler et al. | |
| 2017/0179525 A1 | 6/2017 | Haeupler et al. | |
| 2017/0222232 A1 | 8/2017 | Lockett et al. | |
| 2017/0229735 A1 | 8/2017 | Ahn et al. | |
| 2018/0102541 A1 | 4/2018 | Schubert et al. | |
| 2018/0108911 A1 | 4/2018 | Schubert et al. | |
| 2019/0177445 A1 | 6/2019 | Meier et al. | |
| 2019/0229335 A1 | 7/2019 | Wild et al. | |

FOREIGN PATENT DOCUMENTS

| | | |
|---|---|---|
| WO | 2014/137207 | 9/2014 |
| WO | 2017/220965 | 12/2017 |
| WO | 2020/182327 | 9/2020 |
| WO | 2020/243948 | 12/2020 |
| ZA | 200903978 | 4/2010 |

OTHER PUBLICATIONS

Kim et al., "Preparation and application of TEMPO-based di-radical organic electrode with ionic liquid-based polymer electrolyte", RSC Advances, vol. 2, 2012, pp. 10394-10399.

Kim et al., "Improving the stability of an organic battery with an ionic liquid-based polymer electrolyte", RSC Advances, vol. 2, 2012, pp. 9795-9797.

Lécuyer et al., "A rechargeable lithium/quinone battery using a commercial polymer electrolyte", Electrochemistry Communications, vol. 55, 2015, pp. 22-25.

Li et al., "All-solid-state secondary lithium battery using solid polymer electrolyte and anthraquinone cathode", Solid State Ionics, vol. 300, 2017, pp. 114-119.

Muench et al., "Polymer-Based Organic Batteries", Chemical Reviews, vol. 116, 2016, pp. 9438-9484.

Nesvadba et al., "Synthesis of a polymeric 2,5-di-t-butyl-1,4-dialkoxybenzene and its evaluation as a novel cathode material", Synthetic Metals, vol. 161, 2011, pp. 259-262.

Schmidt et al., "Poly[N-(10-oxo-2-vinylanthracen-9(10H)-ylidene)cyanamide] as a Novel Cathode Material for Li-Organic Batteries", Journal of Polymer Science, vol. 53, 2015, pp. 2517-2523.

Silberstein et al., "Electrochemical lithiation-induced polymorphism of anthraquinone derivatives observed by operando X-ray diffraction", Phys. Chem. Phys., vol. 17, 2015, pp. 27665-27671.

Song et al., "Polyimides: Promising Energy-Storage Materials", Angew. Chem. Int. Ed., vol. 49, 2010, pp. 8444-8448.

Speer et al., "Thianthrene-functionalized polynorbornenes as high-voltage materials for organic cathode-based dual-ion batteries", Chem. Commun., vol. 51, 2015, pp. 15261-15264.

Suga et al., "Emerging N-Type Redox-Active Radical Polymer for a Totally Organic Polymer-Based Rechargeable Battery", Adv. Mater., vol. 21, 2009, pp. 1627-1630.

Suga et al., "p- and n-Type Bipolar Redox-Active Radical Polymer: Toward Totally Organic Polymer-Based Rechargeable Device with Variable Configuration", Adv. Mater., vol. 23, 2011, pp. 751-754.

Tamura et al., "Charge/Discharge Properties of Organometallic Batteries Fabricated with Ferrocene-Containing Polymers", Macromol. Rapid Commun., vol. 29, 2008, pp. 1944-1949.

Weng et al., "Smart Polymeric Cathode Material with Intrinsic Overcharge Protection Based on a 2,5-Di-tert-butyl-1,4-dimethoxybenzene Core Structure", Adv. Funct. Mater., vol. 22, 2012, pp. 4485-4492.

Zhu et al., "All-Solid-State Lithium Organic Battery with Composite Polymer Electrolyte and Pillar[5]quinone Cathode", J. Am. Chem. Soc., vol. 136, 2014, pp. 16461-16464.

Chen et al. "Investigation on high-safety lithium ion battery using polyethylene supported poly(methyl methacrylate-acrylonitrile-butyl acrylate) copolymer based gel electrolyte", Electrochimica Acta, Jan. 19, 2016, vol. 191, pp. 923-932.

International Search Report dated Dec. 17, 2019 in PCT/EP2019/080452, 4 pages.

Written Opinion dated Dec. 17, 2019 in PCT/EP2019/080452, 6 pages.

U.S. Pat. No. 7,960,061, Jun. 14, 2011, 2007/0212615, Jost et al.
U.S. Pat. No. 9,214,659, Dec. 15, 2015, 2008/0138700, Hörpel et al.
U.S. Appl. No. 14/935,841, filed Nov. 9, 2015, 2016/0064712, Hoerpel et al.
U.S. Pat. No. 8,173,305, May 8, 2012, 2010/0183917, Holzapfel et al.
U.S. Appl. No. 11/646,125, filed Dec. 27, 2006, 2008/0160053, McGill et al.
U.S. Pat. No. 7,438,895, Oct. 21, 2008, 2008/0160052, Karl Gallis.
U.S. Appl. No. 12/670,483, filed Jul. 6, 2010, 2010/6304225, Pascaly et al.
U.S. Appl. No. 13/382,399, filed Mar. 20, 2012, 2012/0169297, Schaefer et al.
U.S. Appl. No. 13/990,285, filed Aug. 12, 2013, 2013/0323584, Schaefer et al.
U.S. Appl. No. 14/122,462, filed Nov. 26, 2013, Tim Schaefer.
U.S. Pat. No. 10,103,384, Oct. 16, 2018, 2016/0233509, Haeupler et al.
U.S. Pat. No. 9,890,230, Feb. 13, 2018, 2017/0114162, Haeupler et al.
U.S. Pat. No. 10,263,280, Apr. 16, 2019, 2017/0179525, Haeupler et al.
U.S. Pat. No. 10,957,907, Mar. 23, 2021, 2018/0108911, Schubert et al.
U.S. Appl. No. 15/247,434, filed Aug. 25, 2016, 2017/0058062, Schubert et al.
U.S. Appl. No. 15/247,346, filed Aug. 25, 2016, 2017/0062825, Schubert et al.
U.S. Pat. No. 10,756,348, Aug. 25, 2020, 2018/0102541, Schubert et al.
U.S. Pat. No. 10,844,145, Nov. 24, 2020, 2019/0177445, Meier et al.
U.S. Pat. No. 10,608,255, Mar. 31, 2020, 2019/0229335, Wild et al.
U.S. Appl. No. 16/306,192, filed Nov. 30, 2018, Meier et al.
U.S. Appl. No. 15/733,707, filed Sep. 30, 2020, Wild et al.
U.S. Appl. No. 17/274,185, filed Sep. 9, 2019, Su et al.
Cheng et al., "Mechanical behaviour of poly(methyl methacrylate)", Journal of Materials Science, Vol. 25, 1990, pp. 1917-1923.
Wu et al., "Metal-Organic Framework for Transparent Electronics", Advance Science, vol. 7, 2020, pp. 1903003 (1-10).

* cited by examiner

SOLID ELECTROLYTE FOR ORGANIC BATTERIES

CROSS-REFERENCE TO RELATED APPLICATIONS

This application is the National Stage entry under § 371 of International Application No. PCT/EP2019/080452, filed on Nov. 7, 2019, and which claims the benefit of priority to European Application No. 18212868.6, filed on Dec. 17, 2018. The content of each of these applications is hereby incorporated by reference in its entirety.

The present invention relates to a process for producing a charge storage unit, especially a secondary battery, the electrodes of which comprise an organic redox-active polymer, and which includes a polymeric solid electrolyte. The solid electrolyte is obtained by polymerizing from mixtures of acrylates with methacrylates in the presence of at least one ionic liquid, which imparts advantageous properties to the charge storage unit. The present invention additionally also relates to the charge storage unit itself.

BACKGROUND OF THE INVENTION

The present invention lies in the technical field of organic batteries. The term "organic batteries" is generally understood to mean electrochemical cells that use an organic charge storage material as active electrode material for storage of electrical charge. These batteries are notable for their exceptional properties, such as fast chargeability, long lifetime, low weight, high flexibility and easy processability.

There are already numerous organic polymeric structures that are known as active electrode materials for charge storage. For example, US 2016/0233509 A1, US 2017/0114162 A1, US 2017/0179525 A1, US 2018/0108911 A1, US 2018/0102541 A1, WO 2017/207325 A1 and WO 2015/032951 A1 describe organic electrode materials. An overview of further electrode materials, for example polyimides, is given in the article by S. Muench, A. Wild, C. Friebe, B. Häupler, T. Janoschka, U.S. Schubert, *Chem. Rev.* 2016, 116, 9438-9484.

Particularly promising polymers are considered to be those such as poly(2,2,6,6-tetramethyl-4-piperinidyl-N-oxyl methacrylate) (PTMA; described, for example, in EP 1 381 100 A1 and EP 1 752 474 A1), which are based on the nitroxide radical 2,2,6,6-tetramethylpiperidinyl-N-oxyl (TEMPO), poly(2-vinyl-TCAQ) [Poly(TCAQ)], a polymer based on 11,11,12,12-tetracyano-9,10-anthraquinonedimethane (TCAQ) which is described in US 2017/0114162 A1, and the class of the polyimides described, for example, by Z. Song, H. Zhan, Y. Zhou, *Angew. Chem. Int. Ed.* 2010, 49, 8444-8448.

Nitroxide radicals can be reversibly oxidized to the oxoammonium cation and are therefore particularly suitable for use as active cathode material for organic secondary batteries (reaction <1>; "−e−" in this reaction denotes the charging operation, "+e−" the discharging operation). Poly (TCAQ) in turn can be reversibly reduced to the corresponding dianion and is therefore suitable for use as active anode material (reaction <2>; "−2e−" denotes the discharging operation, "+2e−" the charging operation).

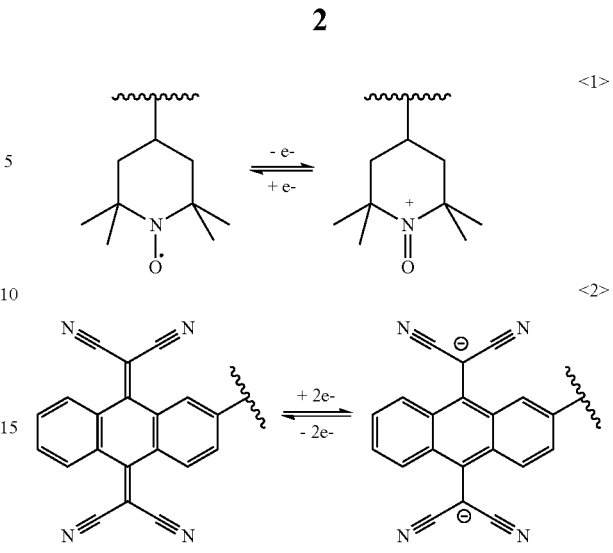

Owing to the low intrinsic electrical conductivity of most redox-active polymers used, they are often used in composite electrodes with addition of conductivity additives and optionally binders. For production of a composite film, the constituents (redox-active polymer, conductivity additive and optionally binder) are stirred together with a solvent to give a homogeneous paste. This is then applied to or printed onto a substrate and subsequently dried.

The present invention relates to the electrolyte of the batteries. The electrolyte has the function of balancing charges that arise at the electrodes by transport of ions. Therefore, high ionic conductivities are required to reduce the cell resistance. Conventional electrolytes consist of polar solvents and conductive salts dissolved therein. However, these liquid electrolytes can escape in the event of a battery defect and additionally usually contain readily combustible liquids.

A further development of such liquid electrolytes by which these problems are countered to a certain degree is that of gel polymer electrolytes. These are liquid electrolytes immobilized in a swollen polymer matrix. These offer a certain advantage with regard to safety since no escape of the generally combustible liquid organic electrolytes is possible. However, the electrolyte is still combustible.

A further stage of development with respect to gel polymer electrolytes is that of solid electrolytes ("solid-state electrolytes" or "polymer electrolytes"). In the case of solid electrolytes, the charge carrier, for example a conductive salt or an ionic liquid, is dissolved in a polar polymer matrix. Solid electrolytes are even more advantageous compared to gel electrolytes since there is not just no risk of escape, but there are also solely nonvolatile components such as ionic liquids. Thus, the risk of combustibility is reduced even further. Furthermore, solid electrolytes, given adequate mechanical stability, can additionally more efficiently assume the function of the separator, which has the function of preventing direct contact between the two electrodes and hence a short circuit or leakage currents.

This invention describes novel printable polymeric electrolytes for fully organic batteries. These are covered by the category of the aforementioned solid electrolytes. In the case of fully organic batteries, the active materials both of the cathode and of the anode are based on organic polymers. Active electrode materials used are, by way of example, the already described polymers PTMA as cathode material and poly(TCAQ) or polyimides as anode material.

Existing fully organic batteries described in the literature almost exclusively use liquid electrolytes or describe the use of polymer electrolytes in metal-based batteries.

EP 3 203 564 A1 describes, for example, gel polymer electrolytes that are used in batteries which have $LiNi_{1/3}Co_{1/3}Mn_{1/3}O_2$ as electrode material and are thus based on lithium.

The use of polymer electrolytes for reducing the solubility of low molecular weight active materials is described, for example, by:

W. Huang, Z. Zhu, L. Wang, S. Wang, H. Li, Z. Tao, J. Shi, L. Guan, J. Chen, *Angew. Chem. Int.* Ed. 2013, 52, 9162-9166 describe a battery having a polymer electrolyte composed of poly(methacrylate) and polyethylene glycol. This contains $LiClO_4$ as conductive salt. Active materials used in the cathode are calix[4]arenes ($C_{28}H_{24}O_4$) that bind lithium ions in a carbon electrode.

J. Kim, A. Matic, J. Ahn, P. Jacobsson, C. Song, *RSC Adv.* 2012, 2, 10394-10399 describe the use of a diradical based on 2,2,6,6-tetramethyl-1-oxyl-4-piperidoxyl (TEMPO) as part of the cathode material. The matrix used is poly(vinylidene fluoride-co-hexafluoropropylene) (PVdF-HFP).

Z. Zhu, M. Hong, D. Guo, J. Shi, Z. Tao, J. Chen, *J. Am. Chem. Soc.* 2014, 136, 16461-16464 describe a lithium battery having pillar[5]quinone ($C_{35}H_{20}O_{10}$) as redox-active charge carrier in the cathode and a polymer electrolyte composed of poly(methacrylate) and polyethylene glycol in combination with $SiO_2$.

M. Lécuyer, J. Gaubicher, A. Barrès, F. Dolhem, M. Deschamps, D. Guyomard, P. Poizot, *Electrochem. Commun.* 2015, 55, 22-25 describe polyethylene oxide as polymer electrolyte in a lithium battery, wherein the redox-active charge carrier is tetramethoxy-p-benzoquinone.

W. Li, L. Chen, Y. Sun, C. Wang, Y. Wang, Y. Xia, *Solid State Ionics* 2017, 300, 114-119 describe a similar lithium ion battery in which anthraquinone functions as charge carrier.

K. Silberstein, J. Pastore, W. Zhou, R. Potash, K. Hernández-Burgos, E. Lobkovskya, H. Abruña, *Phys. Chem. Chem. Phys.* 2015, 17, 27665-27671 describe anthraquinone as active charge material with lithium ion batteries.

A corresponding use of a matrix composed of PVdF-HFP with poly(2,2,6,6-tetramethylpiperidinyloxy methacrylate) (PTMA) as polymeric linear active material is described by J. Kim, A. Matic, J. Ahn, P. Jacobsson, *RSC Adv.* 2012, 2, 9795-9797.

Use of similar polymer electrolytes for increasing the safety of organolithium batteries is described by J. Kim, G. Cheruvally, J. Choi, J. Ahn, D. Choi, C. Eui Song, *J. Electrochem. Soc.* 2007, 154, A839-A843.

The polymer electrolytes described in the prior art are of good suitability for use, for example, in lithium-based batteries. As well as the above-described problems of combustibility observed for gel polymer electrolytes, however, it has also been found that the polymer electrolytes described in the literature, when used in batteries that have at least partly organic electrodes, lead to low capacities.

In addition, specifically in the case of printable batteries, there is a need for a very short production time of a single specimen. This means that, for example, what is desired is a polymer usable as electrolyte that polymerizes rapidly and simultaneously assures a good capacity of the battery thus obtained.

The problem addressed by the present invention was accordingly that of providing a printable organic charge storage unit which is especially suitable for use in organic charge storage units having high capacity and very short production time.

DETAILED DESCRIPTION OF THE INVENTION

A charge storage unit has now been found which comprises such a solid electrolyte and solves this problem.

This printable polymer electrolyte is especially suitable for use in organic, especially fully organic, batteries. It comprises a polymer matrix composed of a polymer which is obtained by polymerization of mixtures of acrylate and methacrylate compounds, for example of acrylate/methacrylate mixtures comprising benzyl and poly(ethylene glycol) methyl ether side chains.

Immobilized therein is an ionic liquid, for example 1-ethyl-3-methylimidazolium bis(trifluoromethylsulfonylimide (EMImTFSI), which assures ionic conductivity for charge transport and increases the flexibility and elasticity of the solid electrolyte. The polymer network, by contrast, serves as matrix for immobilization of the ionic liquid and offers sufficient mechanical stability to function additionally as separator. The polymer electrolyte can be polymerized rapidly and has the feature that it can be used in organic batteries having a high capacity.

1. First Aspect: Process for Producing a Charge Storage Unit

The present invention relates, in a first aspect, to a process for producing a charge storage unit, comprising the following steps:

(a) polymerizing a mixture M comprising at least one compound of the formula (I), at least one compound of the formula (II):

where $R^A$, $R^M$ are independently selected from the group consisting of hydrogen, alkyl group, (poly)ether group, aryl group, aralkyl group, alkaryl group, haloalkyl group, and at least one ionic liquid IL, to obtain a polymer electrolyte $P_{ele}$, (b) disposing the polymer electrolyte $P_{ele}$ obtained in step (a) between two electrodes $E_{cat}$ and $E_{an}$, where $E_{cat}$ and $E_{an}$ each independently comprise at least one conductivity additive L and at least one organic redox-active polymer $P_{redox}$.

1.1 Step (a) of the Process for Producing a Charge Storage Unit

Step (a) of the process for producing a charge storage unit comprises the polymerization of a mixture M comprising at least one compound of the formula (I), at least one compound of the formula (II)

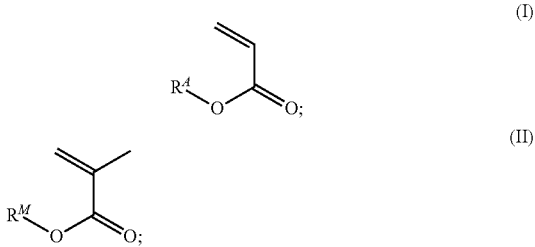

where $R^A$, $R^M$ are independently selected from the group consisting of hydrogen, alkyl group, (poly)ether group, aryl group, aralkyl group, alkaryl group, haloalkyl group, and at least one ionic liquid IL, to obtain a polymer electrolyte $P_{ele}$.

$R^A$, $R^M$ are independently selected from the group consisting of hydrogen, alkyl group, (poly)ether group, aryl group, aralkyl group, alkaryl group, fluoroalkyl group.

Preferably, $R^A$, $R^M$ are independently selected from hydrogen, alkyl group, polyether group, alkaryl group, even more preferably from hydrogen, benzyl, —(CH$_2$CH$_2$O)$_v$R$^v$, even more preferably independently from benzyl, —(CH$_2$CH$_2$O)$_v$R$^v$, where v is an integer ≥2 and v is especially an integer in the range of 3 to 50, more preferably in the range of 5 to 15, even more preferably in the range of 8 to 9; and R$^v$ is selected from the group consisting of hydrogen, alkyl group, which is preferably methyl.

In step (a) of the process according to the invention, the compounds of the formula (I) and (II) are polymerized with one another, while the IL which is likewise included in the mixture M does not take part in the polymerization reaction, but is intercalated in the resultant polymer electrolyte $P_{ele}$.

The compound of the formula (I) is an acrylate-based compound ("acrylate compound"). The compound of the formula (II) is a methacrylate-based compound ("methacrylate compound").

Processes for polymerizing these and corresponding monomers are known to those skilled in the art and are described, for example, in K.-H. Choi, J. Yoo, C. K. Lee, S.-Y. Lee, *Energy Environ. Sci.* 2016, 9, 2812-2821. For example, the production of the polymer electrolyte $P_{ele}$ takes place in a one-stage process via a polymerization in the presence of the ionic liquid.

In this case, especially in step (a) of the process according to the invention, the molar ratio of all compounds of formula (I) included in the mixture M to all compounds of the formula (II) included in the mixture M is in the range of 99:1 to 1:99, preferably in the range of 49:1 to 1:19, more preferably in the range of 97:3 to 1:9, even more preferably in the range of 24:1 to 1:4, still more preferably in the range of 49:1 to 1:3, yet more preferably still in the range of 49:1 to 1:1, and most preferably in the range of 9:1 to 4:1, where the ratio of 9:1 is the very most preferred.

For production of the polymer electrolyte $P_{ele}$, for example as electrolyte film, the mixture M is first mixed as a paste from all components present. After initiation of the polymerization, the mechanically stable and elastic electrolyte film is then formed.

The properties of the paste, in particular the viscosity, can be further optimized here in order to make it employable for printing processes, for example bar coating or screenprinting.

The method described enables performance of the polymerization even in the presence of all components of the electrolyte film, and so no subsequent swelling with electrolyte liquid or other downstream processes such as evaporating of a solvent are required.

1.2 Ionic Liquid IL

The at least one ionic liquid IL included in the mixture M in step (a) of the process according to the invention for production of a charge storage unit is not particularly restricted and is described, for example, in WO 2004/016631 A1, WO 2006/134015 A1, US 2011/0247494 A1 or US 2008/0251759 A1.

More particularly, the at least one ionic liquid IL included in the mixture M in step (a) of the process according to the invention for production of a charge storage unit has the structure $Q^+A^-$.

1.2.1 Preferred Cation $Q^+$ of the IL $Q^+$ therein is a cation selected from the group consisting of the following structures (Q1), (Q2), (Q3), (Q4), (Q5):

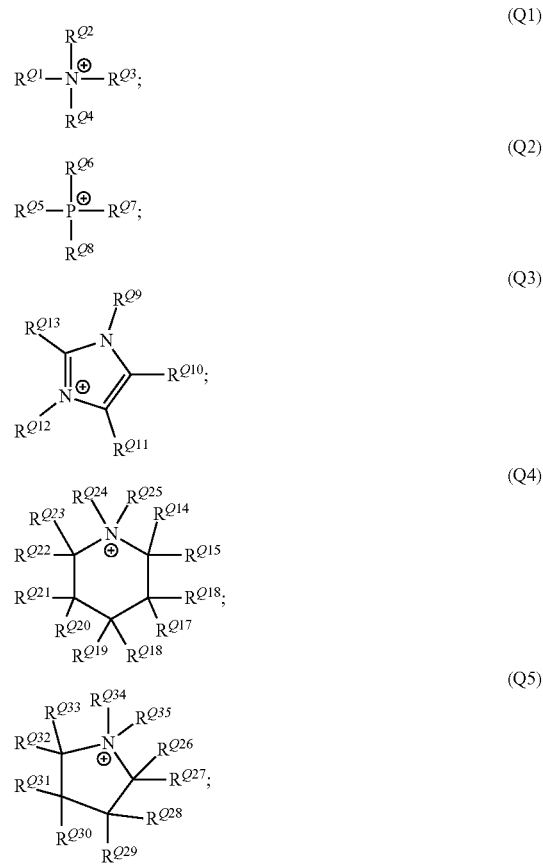

where $R^{Q1}$, $R^{Q2}$, $R^{Q3}$, $R^{Q4}$, $R^{Q5}$, $R^{Q6}$, $R^{Q7}$, $R^{Q8}$ are each independently selected from the group consisting of alkyl group, haloalkyl group, cycloalkyl group, where $R^{Q9}$, $R^{Q10}$, $R^{Q11}$, $R^{Q12}$, $R^{Q13}$, $R^{Q14}$, $R^{Q15}$, $R^{Q16}$, $R^{Q17}$, $R^{Q18}$, $R^{Q19}$, $R^{Q20}$, $R^{Q21}$, $R^{Q22}$, $R^{Q23}$, $R^{Q24}$, $R^{Q25}$, $R^{Q26}$, $R^{Q27}$, $R^{Q28}$, $R^{Q29}$, $R^{Q30}$, $R^{Q31}$, $R^{Q32}$, $R^{Q33}$, $R^{Q34}$, $R^{Q35}$ are each independently selected from the group consisting of hydrogen, alkyl group, (poly)ether group, haloalkyl group, cycloalkyl group.

Preferably, $Q^+$ is a cation selected from the group consisting of the structures (Q1), (Q2), (Q3), (Q4), (Q5) where $R^{Q1}$, $R^{Q2}$, $R^{Q3}$, $R^{Q4}$, $R^{Q5}$, $R^{Q6}$, $R^{Q7}$, $R^{Q8}$ are each independently selected from the group consisting of alkyl group having 6 to 40, more preferably 10 to 30, carbon atoms, cycloalkyl group having 6 to 40, more preferably 10 to 30, carbon atoms,
where $R^{Q9}$, $R^{Q10}$, $R^{Q11}$, $R^{Q12}$, $R^{Q13}$, $R^{Q14}$, $R^{Q15}$, $R^{Q16}$, $R^{Q17}$, $R^{Q18}$, $R^{Q19}$, $R^{Q20}$, $R^{Q21}$, $R^{Q22}$, $R^{Q23}$, $R^{Q24}$, $R^{Q25}$, $R^{Q26}$, $R^{Q27}$, $R^{Q28}$, $R^{Q29}$, $R^{Q30}$, $R^{Q31}$, $R^{Q32}$, $R^{Q33}$, $R^{Q34}$, $R^{Q35}$ are each independently selected from the group consisting of hydrogen, alkyl group having 1 to 25, preferably 1 to 10, carbon atoms, (poly)ether group having 1 to 25, preferably 1 to 10, carbon atoms.

More preferably, $Q^+$ is a cation selected from the group consisting of the structures (Q1), (Q3) where $R^{Q1}$, $R^{Q2}$, $R^{Q3}$, $R^{Q4}$ are each independently selected from the group consisting of alkyl group having 6 to 30, preferably 10 to 25, carbon atoms,
where $R^{Q9}$, $R^{Q10}$, $R^{Q11}$, $R^{Q12}$, $R^{Q13}$ are each independently selected from the group consisting of hydrogen, alkyl group having 1 to 25, preferably 1 to 10, carbon atoms and $R^{Q10}$, $R^{Q11}$, $R^{Q13}$ are more preferably each hydrogen and $R^{Q9}$, $R^{Q12}$ are each independently an alkyl radical having 1 to 6 carbon atoms.

Even more preferably, $Q^+$ is a cation of the structure (Q3) where $R^{Q10}$, $R^{Q11}$, $R^{Q13}$ are each hydrogen and $R^{Q9}$ is selected from the group consisting of methyl, ethyl, n-propyl, iso-propyl, n-butyl, sec-butyl, tert-butyl, and $R^{Q12}$ is selected from the group consisting of methyl, ethyl, n-propyl, iso-propyl, n-butyl, sec-butyl, tert-butyl.

Even more preferably, $Q^+$ is a cation of the structure (Q3) where $R^{Q10}$, $R^{Q11}$, $R^{Q13}$ are each hydrogen and $R^{Q9}$ is selected from the group consisting of methyl, ethyl, n-butyl, preferably selected from the group consisting of ethyl, n-butyl, where $R^{Q9}$ is most preferably ethyl, and $R^{Q12}$ is selected from the group consisting of methyl, ethyl, where $R^{Q12}$ is most preferably methyl.

Particularly preferred as $Q^+$ is the 1-ethyl-3-methylimidazolium cation.

1.2.2 Preferred Anion $A^-$ of the IL

In the aforementioned formula $Q^+A^-$, $A^-$ is an anion, especially selected from the group consisting of phosphate, phosphonate, alkylphosphonate, monoalkylphosphate, dialkylphosphate, bis[trifluoromethanesulfonyl]imide, alkylsulfonate, haloalkylsulfonate, alkylsulfate, haloalkylsulfate, bis[fluorosulfonyl]imide, halide, dicyanamide, hexafluorophosphate, sulfate, tetrafluoroborate, trifluoromethanesulfonate, perchlorate, hydrogensulfate, haloalkylcarboxylate, alkycarboxylate, formate, bisoxalatoborate, tetrachloroaluminate, dihydrogenphosphate, monoalkylhydrogenphosphate, nitrate.

In the aforementioned formula $Q^+A^-$, $A^-$ is preferably selected from the group consisting of phosphate, phosphonate, alkylphosphonate, monoalkylphosphate, dialkylphosphate, bis[trifluoromethanesulfonyl]imide, alkylsulfonate, alkylsulfate, bis[fluorosulfonyl]imide, halide, dicyanamide, hexafluorophosphate, sulfate, tetrafluoroborate, trifluoromethanesulfonate, perchlorate, hydrogensulfate, alkylcarboxylate, formate, bisoxalatoborate, tetrachloroaluminate, dihydrogenphosphate, monoalkylhydrogenphosphate, nitrate, where the alkyl groups in alkylphosphonate, monoalkylphosphate, dialkylphosphate, alkylsulfonate, alkylsulfate, alkylcarboxylate, monoalkylhydrogenphosphate each have 1 to 10, preferably 1 to 6, more preferably 1 to 4, carbon atoms.

In the aforementioned formula $Q^+A^-$, $A^-$ is more preferably selected from the group consisting of dialkylphosphate, bis[trifluoromethanesulfonyl]imide, alkylsulfonate, bis[fluorosulfonyl]imide, chloride, dicyanamide, hexafluorophosphate, tetrafluoroborate, trifluoromethanesulfonate, perchlorate, acetate, propionate, formate, tetrachloroaluminate, monoalkylhydrogenphosphate, nitrate, where the alkyl groups in dialkylphosphate, alkylsulfonate, monoalkylhydrogenphosphate each have 1 to 10, preferably 1 to 6, more preferably 1 to 4, carbon atoms.

In the aforementioned formula $Q^+A^-$, $A^-$ is even more preferably selected from the group consisting of diethylphosphate, bis[trifluoromethanesulfonyl]imide, methanesulfonate, bis[fluorosulfonyl]imide, chloride, dicyanamide, hexafluorophosphate, tetrafluoroborate, trifluoromethanesulfonate, perchlorate, acetate, propionate, formate, tetrachloroaluminate, monoethylhydrogenphosphate, nitrate.

In the aforementioned formula $Q^+A^-$, $A^-$ is even more preferably selected from the group consisting of trifluoromethanesulfonate, bis[trifluoromethanesulfonyl]imide, diethylphosphate, dicyanamide, most preferably from the group consisting of trifluoromethanesulfonate, bis[trifluoromethanesulfonyl]imide, and is at the very most preferably bis[trifluoromethanesulfonyl]imide.

1.2.3 Amount of the IL Used

The amount of the ionic liquid IL included in the mixture M in step (a) of the process according to the invention for production of a charge storage unit is not subject to any further restriction.

However, it is preferable that the total molar amount of all ionic liquids IL included in the mixture M in step (a) of the process according to the invention for production of a charge storage unit, based on the total molar amount of all compounds of the formulae (I) and (II) included in the mixture M, is ≥0.1 molar equivalent, preferably in the range of 0.1 to 50 molar equivalents, more preferably in the range of 0.2 to 10 molar equivalents, even more preferably in the range of 0.3 to 5 molar equivalents, even more preferably in the range of 0.5 to 3 molar equivalents, even more preferably in the range of 1 to 3 molar equivalents, more preferably in the range of 1.1 to 2.9 molar equivalents, more preferably in the range of 1.5 to 2.58 molar equivalents, more preferably in the range of 1 to 2 molar equivalents, even more preferably in the range of 1.76 to 1.87 molar equivalents.

1.3 Preferred Modes of Polymerization

As known to the person skilled in the art, the polymerization of the mixture M in step (a) of the process according to the invention is commenced by adding a polymerization initiator. In the case of the free-radical polymerization which is preferred here, the initiator is a free-radical initiator.

The polymerization is especially effected via free-radical initiation methods such as thermal or UV initiation, preference being given to UV-initiated polymerization, since this offers advantages with regard to reaction times and process configuration.

In the case of thermal initiation, it is possible to use azo initiators such as azobis(isobutyronitrile) (AIBN) or peroxidic free-radical initiators. More particularly, the thermal initiator is selected from the group consisting of peroxidic free-radical initiators and redox systems, particular preference being given to the peroxidic free-radical initiators.

Peroxidic free-radical initiators are preferably selected from the group consisting of persulfates, peroxodisulfates, preferably peroxodisulfates. Persulfates are especially ammonium persulfate, sodium persulfate, potassium persulfate. Peroxodisulfates are especially ammonium peroxodisulfate, sodium peroxodisulfate, potassium peroxodisulfate, more preferably ammonium peroxodisulfate, potassium peroxodisulfate. Redox systems are preferably selected from ammonium iron(II) sulfate/ammonium persulfate, ethanolamine/potassium persulfate.

For UV polymerization, particularly initiators selected from the group consisting of benzophenone, camphorquinone, para-dimethylaminoethyl benzoate, bis-4-(methoxybenzoyl)diethylgermanium, phenylbis(2,4,6-trimethylbenzoyl)phosphine oxide, 2-hydroxy-2-methylpropiophenone, 1-hydroxycyclohexyl phenyl ketone are used, even more preferably bis-4-(methoxybenzoyl)diethylgermanium.

Whereas the UV polymerization of methacrylate-based monomers with benzophenone requires a reaction time of up to one hour, this can be reduced to below 10 minutes by the use of an initiator system consisting of camphorquinone and para-dimethylaminoethyl benzoate. If the methacrylates are replaced by the corresponding acrylates, film formation takes place even after one minute or less.

Free-radical initiators used may be any compounds familiar to the person skilled in the art.

The polymerization initiator, i.e. the free-radical initiator in the case of the free-radical polymerization which is preferred here, is added at the start of the polymerization in step (a) of the process according to the invention for production of a charge storage unit.

1.4 Crosslinkers, Fillers

For optimization of the mechanical properties, in step (a) of the process according to the invention, crosslinkers can also be added, for example ethylene glycol methacrylate or triethylene glycol methacrylate, or ethylene glycol acrylate or triethylene glycol acrylate.

The mixture M thus especially comprises at least one crosslinker, i.e. at least one compound having more than one polymerizable group.

Preferably, the crosslinker is selected from the group consisting of polyfunctional compounds based on (meth)acrylic acid, polyfunctional compounds based on allyl ether, polyfunctional compounds based on vinylic compounds.

Polyfunctional compounds based on (meth)acrylic acid are particularly preferred.

Polyfunctional compounds based on (meth)acrylic acid are especially selected from ethylene glycol di(meth)acrylate, diethylene glycol di(meth)acrylate, triethylene glycol di(meth)acrylate, polyethylene glycol di(meth)acrylate, propane-1,3-diol di(meth)acrylate, butane-2,3-diol di(meth) acrylate, butane-1,4-diol di(meth)acrylate, pentane-1,5-diol di(meth)acrylate, hexane-1,6-diol di(meth)acrylate, heptane-1,7-diol di(meth)acrylate, octane-1,8-diol di(meth) acrylate, nonane-1,9-diol di(meth)acrylate, decane-1,10-diol di(meth)acrylate, trimethylolpropane tri(meth)acrylate, glycerol di(meth)acrylate, 2-hydroxy-3-(meth)acryloyloxypropyl (meth)acrylate, preferably selected from poly(ethylene glycol) diacrylate, tri(ethylene glycol) dimethacrylate.

Polyfunctional compounds based on allyl ether are especially selected from the group consisting of diethylene glycol diallyl ether, dibutylene glycol diallyl ether.

A polyfunctional compound based on vinylic compounds is especially divinylbenzene.

In addition, the mixture M especially comprises a nanoparticle filler, especially (semi)metal oxide nanoparticles, for example fumed silica.

1.5 Arrangement, Step (b)

In step (b) of the process according to the invention for producing a charge storage unit, the polymer electrolyte $P_{ele}$ obtained in step (a) is disposed between two electrodes $E_{cat}$ and $E_{an}$, where $E_{cat}$ and $E_{an}$ each independently comprise at least one conductivity additive L and at least one organic redox-active polymer $P_{redox}$.

All that is required in step (b) is that the polymer electrolyte $P_{ele}$ is disposed between the two electrodes $E_{cat}$ and $E_{an}$. It will be apparent that the charge storage unit may comprise further electrodes as well as the electrodes $E_{cat}$ and $E_{an}$.

"Disposing the polymer electrolyte $P_{ele}$ obtained in step (a) between two electrodes $E_{cat}$ and $E_{an}$" in the context of the invention means any procedure by which the polymer electrolyte $P_{ele}$ obtained in step (a) is obtained between the two electrodes $E_{cat}$ and $E_{an}$.

This can especially be effected by one of the means 1.5.1 to 1.5.4 which follows, particular preference being given to means 1.5.2.

1.5.1 For instance, step (b) of the process according to the invention for producing a charge storage unit can be executed in such a way that the polymer electrolyte $P_{ele}$ is obtained in the first step (a) of the process according to the invention without the mixture M coming into contact with either of the two electrodes $E_{cat}$ and $E_{an}$ prior to the polymerization to give the polymer electrolyte $P_{ele}$, and then the polymer electrolyte $P_{ele}$ is disposed between the two electrodes $E_{cat}$ and $E_{an}$.

1.5.2 Alternatively and preferably, step (b) of the process according to the invention for producing a charge storage unit takes place in such a way that the polymerization of mixture M in step (a) of the process according to the invention is conducted on the surface of at least one of the two electrodes $E_{cat}$ and $E_{an}$, preferably $E_{cat}$, and then the other of the two electrodes $E_{cat}$ and $E_{an}$, preferably $E_{an}$, is pressed onto the polymer electrolyte $P_{ele}$ thus obtained, giving a "sandwich".

1.5.3 In a further embodiment, step (b) of the process according to the invention for producing a charge storage unit takes place in such a way that the polymerization of mixture M in step (a) of the process according to the invention is conducted on the surface of both electrodes $E_{cat}$ and $E_{an}$, and then the two electrodes $E_{cat}$ and $E_{an}$ each having a layer of the polymer electrolyte $P_{ele}$ thus obtained are pressed against one another, giving a "sandwich". The polymerization can be effected in such a way that the electrodes lie horizontally and are wetted by the mixture M from above, which then polymerizes in step (a) to give the polymer electrolyte $P_{ele}$.

1.5.4 Alternatively, $E_{cat}$ and $E_{an}$ may also be vertically opposite one another, for example in a mould, and the mixture M may be introduced into the mould between the two electrodes and then polymerized as per step (a) to give the polymer electrolyte $P_{ele}$.

The procedure according to any of options 1.5.2, 1.5.3 or 1.5.4, especially the procedure according to option 1.5.2, enables better contact of the polymer electrolyte with at least one of the surfaces of the two electrodes $E_{cat}$ and $E_{an}$ and results in a lower electrical resistance in the battery obtained. The mixture M can then be coated onto the electrode surface or applied by screenprinting and be polymerized there to give the polymer electrolyte $P_{ele}$.

On conclusion of step (b) of the process according to the invention for producing a charge storage unit, a charge storage unit comprising the polymer electrolyte $P_{ele}$ and the two electrodes $E_{cat}$ and $E_{an}$ is then obtained in the arrangement $E_{cat}/P_{ele}/E_{an}$.

1.6 Electrodes

The two electrodes $E_{cat}$ and $E_{an}$ that are used in the process for producing a charge storage unit in the first aspect of the invention comprise the electrode material according to the invention and especially a substrate.

1.6.1 Electrode Material

The electrode material which is included in the electrodes $E_{cat}$ and $E_{an}$ comprises at least one conductivity additive L and at least one organic redox-active polymer $P_{redox}$.

Such polymers usable as organic redox-active polymer $P_{redox}$ are known to those skilled in the art and are described, for example, in US 2016/0233509 A1, US 2017/0114162 A1, US 2017/0179525 A1, US 2018/0108911 A1, US 2018/0102541 A1, WO 2017/207325 A1, WO 2015/032951 A1. An overview of further usable organic redox-active polymers is given by the article S. Muench, A. Wild, C. Friebe, B. Häupler, T. Janoschka, U.S. Schubert, *Chem. Rev.* 2016, 116, 9438-9484.

The organic redox-active polymer $P_{redox}$ is preferably selected from the group consisting of polyimides and polymers comprising m units of the general formula (III):

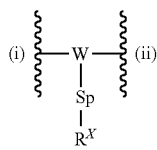

(III)

where m is an integer ≥4, preferably an integer ≥10, more preferably an integer ≥100, even more preferably an integer in the range of 1000 to $10^9$, yet more preferably an integer in the range of 2000 to 10 000, W is a repeat unit, Sp is an organic spacer and $R^X$ is an organic redox-active group, where the bond identified by (i) in a unit of the formula (III) binds to the bond identified by (ii) in the adjacent unit of the formula (III).

$R^X$ in the structure (III) is preferably selected from the group consisting of compounds of the general formulae (III-A), (III-B), (III-C), (III-D) where

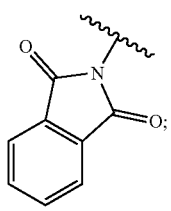

(III-A)

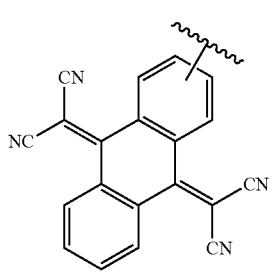

(III-B)

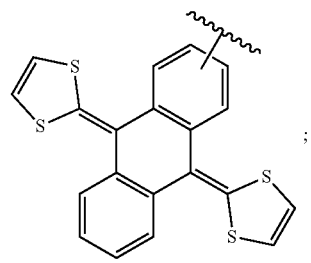

(III-C)

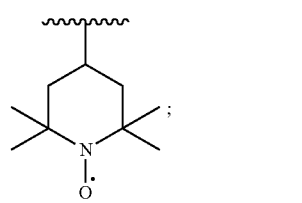

(III-D)

and where, in the structures (III-A), (III-B) and (III-C), at least one aromatic carbon atom may be substituted by a group selected from alkyl group, halogen group, alkoxy group, hydroxyl group. Even more preferably, $R^X$ in the structure (Ill) is selected from the group consisting of compounds of the general formulae (III-A), (III-B), (III-C), (III-D).

W in the structure (Ill) is a repeat unit, and the person skilled in the art is able to select this using his knowledge in the art. Sp are connecting units between the redox-active units and the repeat units W that may likewise be selected by the person skilled in the art from alkyl group, halogen group, alkoxy group, hydroxyl group.

Preferably, the W radical in the structure (III) is selected from the group consisting of the structures (W1), (W2), (W3):

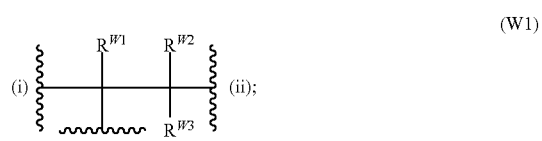

(W1)

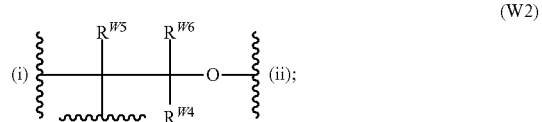

(W2)

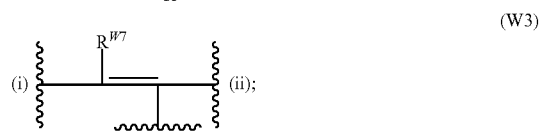

(W3)

where the bond identified by (i) in a unit of the formula (W1), (W2), (W3) binds in each case to the bond identified by (ii) in the adjacent unit of the formula (W1), (W2) or (W3), where the bond identified by (iii) in each case indicates the bond to Sp, and where $R^{W1}$, $R^{W2}$, $R^{W3}$, $R^{W4}$, $R^{W5}$, $R^{W6}$, $R^{W7}$ are independently selected from the group consisting of hydrogen, alkyl group, haloalkyl group, —$COOR^{W8}$ with $R^{W8}$=H or alkyl, and $R^{W1}$, $R^{W2}$, $R^{W3}$, $R^{W4}$, $R^{W5}$, $R^{W6}$, $R^{W7}$ are preferably independently selected from the group consisting of hydrogen, methyl, —COOH, —$COOCH_3$, and where, even more preferably, the W radical in the structure (Ill) has the structure (W1) in which one of $R^{W1}$, $R^{W2}$, $R^{W3}$ is methyl and the other two are hydrogen or all $R^{W1}$, $R^{W2}$, $R^{W3}$ are hydrogen; and the Sp radical in the structure (Ill) is selected from the group consisting of direct bond, (Sp1), (Sp2):

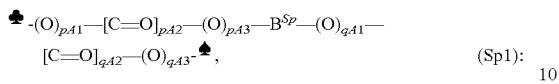
(Sp1):

(Sp2):

where pA1, pA2, pA3 in each case is 0 or 1, excluding the case that "pA2=0, pA1=pA3=1",
where qA1, qA2, qA3 in each case is 0 or 1, excluding the case that "qA2=0, qA1=qA3=1",
where qA4, qA5, qA6 in each case is 0 or 1, where at least one of qA4, qA5, qA6=1 and excluding the case that "qA5=0, qA4=qA6=1",
where $B^{Sp}$ is selected from the group consisting of
divalent (hetero)aromatic radical, preferably phenyl,
divalent aliphatic radical, which is preferably alkylene, optionally substituted by at least one group selected from nitro group, —NH$_2$, —CN, —SH, —OH, halogen and optionally having at least one group selected from ether, thioether, amino ether, carbonyl group, carboxylic ester, carboxamide group, sulfonic ester, phosphoric ester,
and where in the cases in which Sp binds to a non-carbon atom in the $R^X$ radical, the structure (Sp1) is subject to the additional condition "qA3=0, qA2=1, qA1=1 or qA3=qA2=qA1=0 or qA3=0, qA2=1, qA1=0", preferably the condition "qA3=qA2=qA1=0", and the structure (Sp2) is subject to the additional condition that "qA6=0, qA5=1, qA4=1 or qA6=0, qA5=1, qA4=0",
and where "♠" denotes the bond pointing toward $R^X$,
and where "♣" denotes the bond pointing toward W.

It is pointed out that the condition "where at least one of qA4, qA5, qA6=1", in respect of Sp2, relates solely to the definition of the respective variables qA4, qA5, qA6 and does not mean that the Sp radical in the structure (III) cannot also be a direct bond.

More preferably, the Sp radical is selected from the group consisting of direct bond, (Sp2) with (Sp2): ♠-[C=O]—(O)-♣ where "♠" denotes the bond pointing toward $R^X$, and where "♣" denotes the bond pointing toward W.

If the polymer $P_{redox}$ is a polyimide, it is preferably selected from the group consisting of the structures (IV-1), (IV-2), (IV-3), (IV-4), (IV-5), (IV-6), (IV-7):

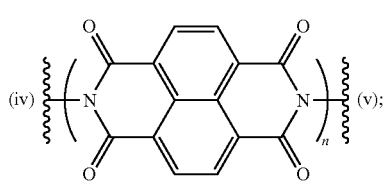
(IV-1)

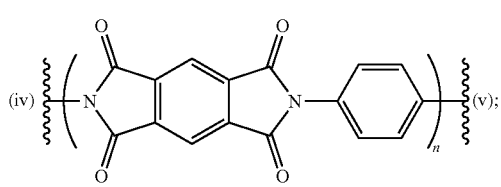
(IV-2)

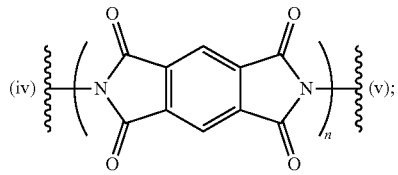
(IV-3)

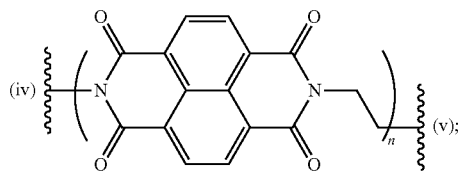
(IV-4)

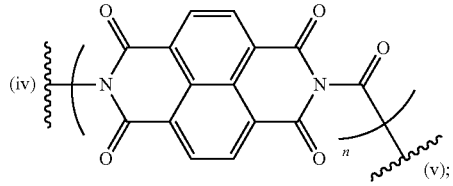
(IV-5)

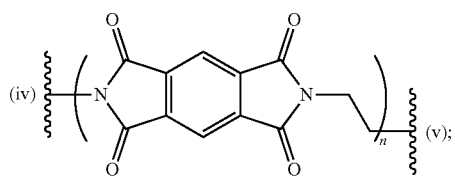
(IV-6)

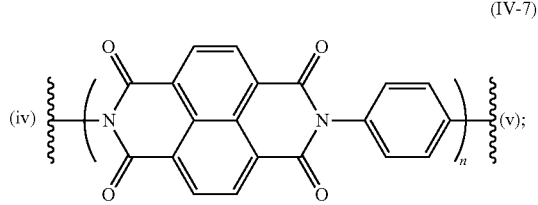
(IV-7)

where n is an integer ≥4, preferably an integer ≥10, more preferably an integer ≥100, even more preferably an integer in the range of 1000 to $10^9$, yet more preferably an integer in the range of 2000 to 10 000, and the bond identified by (iv) in the structures (IV-1), (IV-2), (IV-3), (IV-4), (IV-5), (IV-6), (IV-7) binds in each case to the bond identified by (v), and where, in the structures (IV-1), (IV-2), (IV-3), (IV-4), (IV-5), (IV-6), (IV-7), at least one aromatic carbon atom may be substituted by a group selected from alkyl group, halogen group, alkoxy group, hydroxyl group.

If the polymer $P_{redox}$ is a polyimide, this is more preferably selected from the group consisting of the structures (IV-1), (IV-2), (IV-3), (IV-4), (IV-5), (IV-6), (IV-7), where n is an integer ≥4, preferably an integer ≥10, more preferably an integer ≥100, even more preferably an integer in the range of 1000 to $10^9$, yet more preferably an integer in the range of 2000 to 10 000, and the bond identified by (iv) in the structures (IV-1), (IV-2), (IV-3), (IV-4), (IV-5), (IV-6), (IV-7) binds in each case to the bond identified by (v).

More preferably, the polymer $P_{redox}$ comprises t repeat units joined to one another, selected from the group consisting of the structures P1, P2, P3:

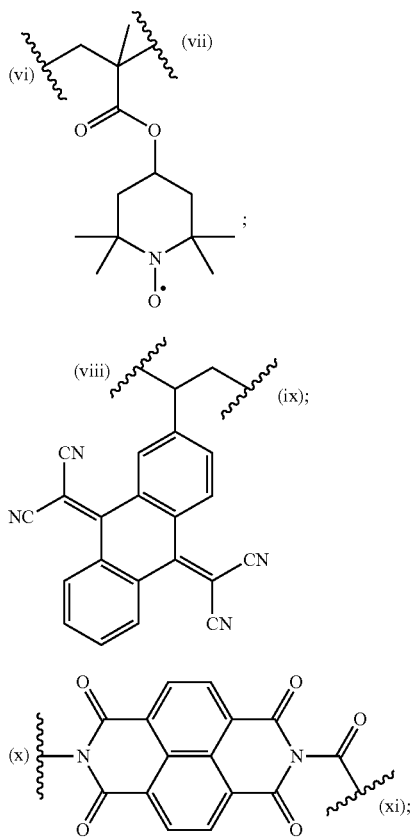

where t is an integer ≥4, preferably an integer ≥10, more preferably an integer ≥100, even more preferably an integer in the range of 1000 to $10^9$, yet more preferably an integer in the range of 2000 to 10 000,
and the bond identified by (vi) in a unit of the formula P1 binds to the bond identified by (vii) in the adjacent unit of the formula P1,
and the bond identified by (viii) in a unit of the formula P2 binds to the bond identified by (ix) in the adjacent unit of the formula P2,
and the bond identified by (x) in a unit of the formula P3 binds to the bond identified by (xi) in the adjacent unit of the formula P3.

In a preferred embodiment of the process according to the invention for producing a charge storage unit, the polymer P1 is included as polymer $P_{redox}$ in the electrode material of the electrode $E_{cat}$ used as cathode, and at least one of the two polymers P2, polymer P3 is included as polymer $P_{redox}$ in the electrode material of the electrode $E_{an}$ used as anode.

The end groups of the first repeat units in the polymer $P_{redox}$ which are present for these in the chemical structure (III) at the bonds defined by "(i)", and are present for these in the chemical structure P1 at the bonds defined by "(vi)", and are present for these in the chemical structure P2 at the bonds defined by "(viii)", and are present for these in the chemical structure P3 at the bonds defined by "(x)", and are present for these in each of the chemical structures (IV-1), (IV-2), (IV-3), (IV-4), (IV-5), (IV-6), (IV-7) at the bonds defined by "(iv)",
and the end groups of the last repeat units in the inventive polymer $P_{redox}$ which are present for these in the chemical structure (III) at the bonds defined by "(ii)", and are present for these in the chemical structure P1 at the bonds defined by "(vii)", and are present for these in the chemical structure P1 at the bonds defined by "(ix)", and are present for these in the chemical structure P1 at the bonds defined by "(xi)", and are present for these in each of the chemical structures (IV-1), (IV-2), (IV-3), (IV-4), (IV-5), (IV-6), (IV-7) at the bonds defined by "(v)",
are not particularly restricted and are apparent from the polymerization method used in the preparation method for the polymer $P_{redox}$. Thus, they may be termination fragments of an initiator or a repeat unit. Preferably, these end groups are selected from hydrogen, halogen, hydroxyl, unsubstituted radical or aliphatic radical substituted by —CN, —OH, halogen (which may especially be an unsubstituted or correspondingly substituted alkyl group), (hetero)aromatic radical, which is preferably a phenyl radical, benzyl radical or α-hydroxybenzyl.

More particularly, the electrode material included in the electrodes $E_{cat}$ and $E_{an}$ also comprises at least one ionic liquid $IL_{ele}$. The ionic liquid $IL_{ele}$ included in the electrode material especially has the structure $Q^+A^-$ where $Q^+$ is preferably selected as described in point 1.2.1 and $A^-$ is preferably selected as described in point 1.2.2.

1.6.2 Process for Preparing the Polymers P According to the Invention

The polymers $P_{redox}$ can be obtained by methods known to those skilled in the art.

The corresponding methods are summarized by S. Muench, A. Wild, C. Friebe, B. Häupler, T. Janoschka, U.S. Schubert, *Chem. Rev.* 2016, 116, 9438-9484.

In addition, the synthesis of the polymers $P_{redox}$ comprising a redox-active aromatic imide function is described in WO 2015/003725 A1 and U.S. Pat. No. 4,898,915 A.

In addition, polymers $P_{redox}$ comprising a redox-active aromatic function comprising at least one stable oxygen radical and the synthesis of the corresponding polymers $P_{redox}$ are also known to the person skilled in the art from WO 2017/207325 A1, EP 1 752 474 A1, WO 2015/032951 A1, CN 104530424 A, CN 104530426 A, T. Suga, H. Ohshiro, S. Sugita, K. Oyaizu, H. Nishide, *Adv. Mater.* 2009, 21, 1627-1630 and T. Suga, S. Sugita, H. Ohshiro, K. Oyaizu, H. Nishide, *Adv. Mater.* 2011, 3, 751-754.

In addition, the synthesis of polymers $P_{redox}$ comprising a redox-active anthraquinone/carbazole function and the synthesis of the polymers $P_{redox}$ comprising a redox-active benzoquinone function are also described in, or is possible as a matter of routine for the person skilled in the art on the basis of his knowledge in the art from, WO 2015/132374 A1, WO 2015/144798 A1, EP 3 279 223 A1, WO 2018/024901A1, US 2017/0077518 A1, US 2017/0077517 A1, US 2017/0104214 A1, D. Schmidt, B. Häupler, C. Stolze, M. D. Hager, U.S. Schubert, *J. Polym. Sci., Part A: Polym. Chem.* 2015, 53, 2517-2523, M. E. Speer, M. Kolek, J. J. Jassoy, J. Heine, M. Winter, P. M. Bieker, B. Esser, *Chem. Commun.* 2015, 51, 15261-15264 and M. Baibarac, M. Lira-Cantú, J. Oró Sol, I. Baltog, N. Casañ-Pastor, P. Gomez-Romero, *Compos. Sci. Technol.* 2007, 67, 2556-2563.

In addition, the synthesis of polymers $P_{redox}$ comprising a redox-active dialkoxybenzene function is also described in WO 2017/032583 A1, EP 3 136 410 A1, EP 3 135 704 A1, WO 2017/032582 A1, P. Nesvadba, L. B. Folger, P. Maire, P. Novak, *Synth. Met.* 2011, 161, 259-262; W. Weng, Z. C. Zhang, A. Abouimrane, P. C. Redfern, L. A. Curtiss, K. Amine, *Adv. Funct. Mater.* 2012, 22, 4485-4492.

In addition, the synthesis of polymers $P_{redox}$ comprising a redox-active triphenylamine function is also described in JP 2011-74316 A, JP 2011-74317 A.

In addition, the synthesis of polymers $P_{redox}$ comprising a redox-active viologen function is also described in CN 107118332 A.

In addition, the synthesis of polymers $P_{redox}$ comprising a redox-active ferrocene function is also described in K. Tamura, N. Akutagawa, M. Satoh, J. Wada, T. Masuda, *Macromol. Rapid Commun.* 2008, 29, 1944-1949.

1.6.3 Crosslinking

The polymers $P_{redox}$ that are included in the electrodes $E_{cat}$ and $E_{an}$ that are used in the process for producing a charge storage unit in the first aspect of the invention may be either homopolymers or copolymers. Homopolymers are polymers which have been synthesized only from one monomer. Copolymers are polymers which have been synthesized from two or more monomers. Further monomers ("comonomers") used may be those that have a polymerizable group, or else have two or more polymerizable groups, for example divinylbenzenes, diethynylbenzenes, diethynylthianthrenes, oligo- or polyethylene glycol di(meth)acrylates. This then leads to additional crosslinks in the polymer. This is known to the person skilled in the art (described, for example, in WO 2018/060680 A1, paragraph [0028]). The degree of crosslinking of the polymers that are then obtained can be controlled by processes known to the person skilled in the art via the amount of comonomer added or else via a time delay (for instance in that the comonomer is not added until the polymerization is at an advanced stage). If two or more monomers are used in the synthesis, the monomers of the repeat units in the polymer $P_{redox}$, according to this invention, may be present in random distribution, as blocks or in alternation.

Thus, the polymer $P_{redox}$ may also have repeat units attributable to the use of crosslinkers during the synthesis of the polymer $P_{redox}$. It will thus be apparent that repeat units attributable to the crosslinker may also be present in the resulting polymer $P_{redox}$ between the repeat units of the structure (III) or within the polyimides.

Suitable crosslinkers are especially the crosslinkers described above in point 1.4.

1.6.4 Preferred Conductivity Additives L

The conductivity additive L which is included in the electrodes $E_{cat}$ and $E_{an}$ that are used in the process for producing a charge storage unit in the first aspect of the invention is at least one electrically conductive material, especially selected from the group consisting of carbon materials, electrically conductive polymers, metals, semimetals, (semi)metal compounds, preferably selected from carbon materials, electrically conductive polymers.

According to the invention, "(semi)metals" are selected from the group consisting of metals, semimetals, and are preferably metals.

Metals are especially selected from the group consisting of zinc, iron, copper, silver, gold, chromium, nickel, tin, indium.

Semimetals are especially selected from silicon, germanium, gallium, arsenic, antimony, selenium, tellurium, polonium.

The conductivity additive is more preferably a carbon material. Carbon materials are especially selected from the group consisting of carbon fibres, carbon nanotubes, graphite, graphene, carbon black, fullerene.

Electrically conductive polymers are especially selected from the group consisting of polypyrroles, polyanilines, polyphenylenes, polypyrenes, polyazulenes, polynaphthylenes, polycarbazoles, polyindoles, polyazepines, polyphenylene sulfides, polythiophenes, polyacetylenes, poly(3,4-ethylenedioxythiophene) polystyrenesulfonate (=PEDOT:PSS), polyarcenes, poly-(p-phenylenevinylenes).

1.6.5 Preferred Amount of the Conductivity Additives L

The amount of the conductivity additive L included in the electrode $E_{cat}$ or $E_{an}$ in the process according to the first aspect of the invention is not subject to any further restriction. However, it is preferable that the total weight of the conductivity additive L included in the electrode $E_{cat}$ or $E_{an}$, based on the total weight of the redox polymer $P_{redox}$ included in the electrode $E_{cat}$ or $E_{an}$, is in the range of 0.1% to 1000% by weight, preferably in the range of 10% to 500% by weight, more preferably in the range of 30% to 100% by weight, yet more preferably in the range of 40% to 80% by weight, even more preferably in the range of 50% by weight to 60% by weight, and is most preferably 58.3% by weight.

1.6.6 Binder Additive

The electrodes $E_{cat}$ and $E_{an}$ that are used in the process for producing a charge storage unit in the first aspect of the invention especially also comprise a binder additive.

Binder additives are familiar to the person skilled in the art as materials having binding properties. Preference is given to polymers selected from the group consisting of polytetrafluoroethylene, polyvinylidene fluoride, polyhexafluoropropylene, polyvinyl chloride, polycarbonate, polystyrene, polyacrylate, polymethacrylate, polysulfone, cellulose derivatives, polyurethane, and the binder additive more preferably comprises cellulose derivatives, e.g. sodium carboxymethylcellulose, or polyvinylidene fluoride.

In the cases in which at least one of the electrodes $E_{cat}$ and $E_{an}$ comprises a binder additive, the amount thereof used is not subject to any further restriction. In these cases, however, it is preferable that the total weight of the binder additive included in the electrode $E_{cat}$ or $E_{an}$, based on the total weight of the redox polymer $P_{redox}$ included in the electrode $E_{cat}$ or $E_{an}$, is in the range of 0.001% to 100% by weight, more preferably in the range of 0.083% to 90% by weight, even more preferably in the range of 3% to 70% by weight, even more preferably in the range of 5% to 50% by weight, yet more preferably in the range of 8.3% by weight to 20% by weight, and is most preferably 16.6% by weight.

1.6.7 Substrate for the Electrodes

The two electrodes $E_{cat}$ and $E_{an}$ especially also have a substrate.

The substrate of the electrodes $E_{cat}$ and $E_{an}$ that are used in the process for producing a charge storage unit in the first aspect of the invention is especially selected from conductive materials, preferably metals, carbon materials, oxide substances.

Metals suitable with preference as substrate are selected from platinum, gold, iron, copper, aluminium, zinc or a combination of these metals. Preferred carbon materials suitable as substrate are selected from glassy carbon, graphite foil, graphene, carbon skins. Preferred oxide substances suitable as substrate for the electrode element are, for example, selected from the group consisting of indium tin oxide (ITO), indium zinc oxide (IZO), antimony zinc oxide (AZO), fluorine tin oxide (FTO) or antimony tin oxide (ATO), zinc oxide (ZO).

If the electrodes $E_{cat}$ and $E_{an}$ have a substrate, the surface layer of the two electrodes $E_{cat}$ and $E_{an}$ especially includes at least the polymer $P_{redox}$ and the conductivity additive L as redox-active material for charge storage.

Such substrate-comprising electrodes $E_{cat}$ and $E_{an}$ can be produced by methods known to those skilled in the art: The electrode material is especially applied to the substrate of the electrode element as an electrode slurry.

The electrode slurry in this case is especially a solution or suspension and comprises the polymer $P_{redox}$, optionally the above-described ionic liquid $IL_{redox}$, and the above-described conductivity additive L and optionally the above-described binder additive.

The electrode slurry preferably also comprises a solvent. Solvents used for the electrode slurry are independently one or more solvents, preferably solvents having a high boiling point, more preferably selected from the group consisting of N-methyl-2-pyrrolidone, water, dimethyl sulfoxide, ethylene carbonate, propylene carbonate, dimethyl carbonate, methyl ethyl carbonate, γ-butyrolactone, tetrahydrofuran, dioxolane, sulfolane, N,N-dimethylformamide, N,N'-dimethylacetamide, preferably N-methyl-2-pyrrolidone, water, more preferably N-methyl-2-pyrrolidone. The concentration of the redox-active material, especially of the polymer $P_{redox}$, for storage of electrical energy in the abovementioned electrode slurry is preferably between 1 and 100 mg/ml, more preferably between 5 and 50 mg/ml.

In the preferred embodiment in which the electrode material takes the form here of at least partial surface coating of electrodes $E_{cat}$ and $E_{an}$ for electrical charge storage means, especially secondary batteries, each electrode $E_{cat}$ and $E_{an}$ has a layer at least in part on a substrate surface. This layer especially comprises the polymer $P_{redox}$, at least one conductivity additive, optionally at least one ionic liquid, and optionally also at least one binder additive.

The application of the electrode material to the substrate is possible by means of methods known to those skilled in the art. More particularly, electrode material is applied as electrode slurry to the substrate by means of bar coating, slot die coating, screenprinting or stencil printing.

2. Second Aspect: Charge Storage Unit Obtainable by the Process According to the Invention The present invention also relates, in a second aspect, to a charge storage unit as obtained by the process for producing a charge storage unit in the first aspect of the invention.

The charge storage unit in the second aspect of the invention is especially a secondary battery.

3. Third Aspect: Charge Storage Unit

The present invention also relates, in a third aspect, to a charge storage unit, especially a secondary battery, comprising a polymer electrolyte $P_{ele}$ disposed between two electrodes $E_{cat}$ and $E_{an}$, where $E_{cat}$ and $E_{an}$ each independently comprise at least one conductivity additive L and at least one organic redox-active polymer $P_{redox}$,
characterized in that
the polymer electrolyte $P_{ele}$ is obtained by polymerizing a mixture M comprising at least one compound of the formula (I), at least one compound of the formula (II)

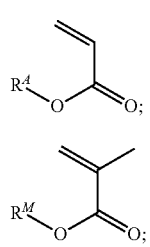

where $R^A$, $R^M$ are independently selected from the group consisting of hydrogen, alkyl group, (poly)ether group, aryl group, aralkyl group, alkaryl group, haloalkyl group, and at least one ionic liquid IL.

The preferred definitions for $R^A$, $R^M$ are those described in point 1.1 in the context of the process according to the invention for producing a charge storage unit.

The charge storage unit may be produced by the process for producing a charge storage unit in the first aspect of the present invention.

In this case, in particular, the molar ratio of all compounds of formula (I) included in the mixture M to all compounds of the formula (II) included in the mixture M is in the range of 99:1 to 1:99, preferably in the range of 49:1 to 1:19, more preferably in the range of 97:3 to 1:9, even more preferably in the range of 24:1 to 1:4, still more preferably in the range of 49:1 to 1:3, yet more preferably still in the range of 49:1 to 1:1, and most preferably in the range of 9:1 to 4:1, where the ratio of 9:1 is the very most preferred.

3.1 Ionic Liquid IL

The ionic liquids IL usable in the charge storage unit in the third aspect of the present invention are not particularly restricted and are described, for example, in WO 2004/016631 A1, WO 2006/134015 A1, US 2011/0247494 A1 or US 2008/0251759 A1.

More particularly, the ionic liquid IL usable in the polymerization to obtain the polymer of the charge unit according to the invention has the structure $Q^+A^-$ where the cations $Q^+$ used are preferably the structures (Q1), (Q2), (Q3), (Q4), (Q5) described in point 1.2.1 with the preferred embodiments described therein and the anions $A^-$ used are those described preferably in point 1.2.2 with the preferred embodiments described therein.

The amount of the ionic liquid IL used in the characterizing part of the charge unit according to the invention is not subject to any further restriction. However, it is preferable that the total molar amount of all ionic liquids IL included in the mixture M, based on the total molar amount of all compounds of the formula (I) and (II) included in the mixture M, corresponds to that in point 1.2.3 for the mixture M in step (a) of the process according to the invention for producing a charge unit.

3.2 Preferred Modes of Polymerization

The polymerization of the mixture M to give the polymer electrolyte $P_{ele}$ can be conducted as described in the above point 1.3.

3.3 Crosslinkers, Fillers

The mixture M preferably also includes, as crosslinkers, compounds having more than one polymerizable group. Preferred crosslinkers are described in point 1.4.

The mixture M especially also contains a nanoparticulate filler, for example fumed silica.

The method described enables performance of the polymerization even in the presence of all components of the electrolyte film, and so no subsequent swelling with electrolyte liquid or other downstream processes such as evaporating of a solvent are required.

3.4 Arrangement

In the charge storage unit, in the third aspect of the invention, the polymer electrolyte $P_{ele}$ is disposed between two electrodes $E_{cat}$ and $E_{an}$ in the charge storage unit.

In the context of the invention, this means any geometry in which the polymer $P_{ele}$ lies between the two electrodes $E_{cat}$ and $E_{an}$.

Thus, this arrangement can be achieved in that the polymer is obtained in the polymerization as in the above points 1.5.1, 1.5.2, 1.5.3 or 1.5.4 of the process according to the invention and then disposed between the two electrodes.

3.5 Electrodes

The electrodes $E_{cat}$ and $E_{an}$ that are included in the charge storage unit in the third aspect of the invention comprise the electrode material and especially a substrate.

3.5.1 Electrode Material

The electrode material which is included in the electrodes $E_{cat}$ and $E_{an}$ comprises at least one conductivity additive L and at least one organic redox-active polymer $P_{redox}$.

The organic redox-active polymer $P_{redox}$ is that described in the above point 1.6.1. This can be produced as described in the above point 1.6.2, and it is possible to use the crosslinkers mentioned in point 1.6.3.

3.5.2 Preferred Conductivity Additives L

The conductivity additive L included in the electrodes $E_{cat}$ and $E_{an}$ that are included in the charge storage unit in the third aspect of the invention is especially that described in the above point 1.6.4.

The amount of the conductivity additive L included in the electrode $E_{cat}$ or $E_{an}$ in the charge storage unit in the third aspect of the invention is not subject to any further restriction and is preferably as described in the preceding point 1.6.5.

3.5.3 Binder Additive

The electrodes $E_{cat}$ and $E_{an}$ that are used in the charge storage unit in the third aspect of the invention especially also comprise a binder additive.

3.5.4 Substrate for the Electrodes

The two electrodes $E_{cat}$ and $E_{an}$ in the charge storage unit in the third aspect of the present invention especially also include a substrate as described in point 1.6.7.

4. Definitions

"(Meth)acrylate" in the context of the invention means at least one compound selected from the group consisting of acrylate and methacrylate.

"(Meth)acrylic acid" in the context of the invention means at least one compound selected from the group consisting of acrylic acid and methacrylic acid.

"Where the bond identified by (iii) in the structures (IV-1), (IV-2), (IV-3), (IV-4), (IV-5), (IV-6), (IV-7) binds in each case to the bond identified by (iv)" means that the bond identified by (iii) in the structure (IV-1) binds to the bond identified by (iv) in the structure (IV-1), and that the bond identified by (iii) in the structure (IV-2) binds to the bond identified by (iv) in the structure (IV-2), and the bond identified by (iii) in the structure (IV-3) binds to the bond identified by (iv) in the structure (IV-3), and the bond identified by (iii) in the structure (IV-4) binds to the bond identified by (iv) in the structure (IV-4), and the bond identified by (iii) in the structure (IV-5) binds to the bond identified by (iv) in the structure (IV-5), and the bond identified by (iii) in the structure (IV-6) binds to the bond identified by (iv) in the structure (IV-6), and the bond identified by (iii) in the structure (IV-7) binds to the bond identified by (iv) in the structure (IV-7).

The condition "where at least one of qA4, qA5, qA6=1" relates here merely to the definition of the respective variables in the structure (Sp2), and is not intended to rule out the possibility that Sp may also be a direct bond.

In the context of the invention, an alkyl group is branched or unbranched and has preferably 1 to 30, more preferably 1 to 12, even more preferably 1 to 8, even more preferably still 1 to 6, most preferably 1 to 4, carbon atoms.

In the context of the invention, an "unbranched or branched alkyl group having 1 to 4 carbon atoms" is especially selected from the group consisting of methyl, ethyl, n-propyl, isopropyl, n-butyl, sec-butyl, isobutyl, tert-butyl, preferably methyl, ethyl, n-butyl, more preferably n-butyl.

An aryl group in the context of the invention especially has 6 to 15, more preferably 6 to 10, carbon atoms. An aryl group having 6 to 15 carbon atoms in the context of the present invention is especially selected from phenyl, 1-naphthyl, 2-naphthyl, 9-anthryl, 9-phenanthryl.

An aryl group having 6 to 10 carbon atoms in the context of the present invention is especially selected from phenyl, 1-naphthyl, 2-naphthyl, preferably phenyl.

An aralkyl group is formally derived from an alkyl group in which at least one hydrogen atom in the alkyl group is replaced by an aryl group. An aralkyl group in the context of the invention is especially selected from the group consisting of benzyl, 2-phenylethyl, more preferably benzyl.

An alkylaryl group is formally derived from an aryl group in which at least one hydrogen atom in the aryl group is replaced by an alkyl group. An alkaryl group in the context of the invention is especially selected from the group consisting of tolyl, dimethylphenyl.

According to the invention, a (poly)ether group is a group selected from ether group, polyether group.

An ether group is formally derived from an alkyl group in which a non-terminal $CH_2$ group is replaced by an oxygen atom.

A polyether group is formally derived from an alkyl group in which at least two non-adjacent $CH_2$ groups, one of which may be terminal, have been replaced by an oxygen atom. A preferred polyether group is a group of the $-(CH_2CH_2O)_v R^v$ form where v is an integer $\geq 3$, and v is especially an integer in the range of 3 to 50, more preferably in the range of 5 to 15, even more preferably in the range of 8 to 9; and $R^v$ is selected from the group consisting of hydrogen, alkyl group, which is preferably methyl.

A haloalkyl group in the context of the invention is an alkyl group in which at least one hydrogen atom has been replaced by a halogen atom, preferably fluorine.

EXAMPLES

1. Chemicals Used

All solvents and materials were sourced from commercial manufacturers and used without further purification.

1-Ethyl-3-methylimidazolium bis(trifluoromethylsulfonyl)imide has CAS Number 174899-82-2 ($M_n$=391.31 g $mol^{-1}$).

1-Ethyl-3-methylimidazolium trifluoromethanesulfonate has CAS Number 145022-44-2 ($M_n$=260.23 g $mol^{-1}$).

Camphorquinone (racemate) has CAS Number 10373-78-1 ($M_n$=166.22 g $mol^{-1}$).

Ivocerin® [=bis-4-(methoxybenzoyl)diethylgermanium] has CAS Number 1207515-90-9 ($M_n$=401.04 g $mol^{-1}$).

Ethyl dimethylaminobenzoate (=para-dimethylamino ethyl benzoate) has CAS Number 10287-53-3 ($M_n$=193.24 g $mol^{-1}$).

2. Polymers Used

In the experiments, the following polymers $P_{cat}$, $P_{an1}$ and $P_{an2}$ were used:

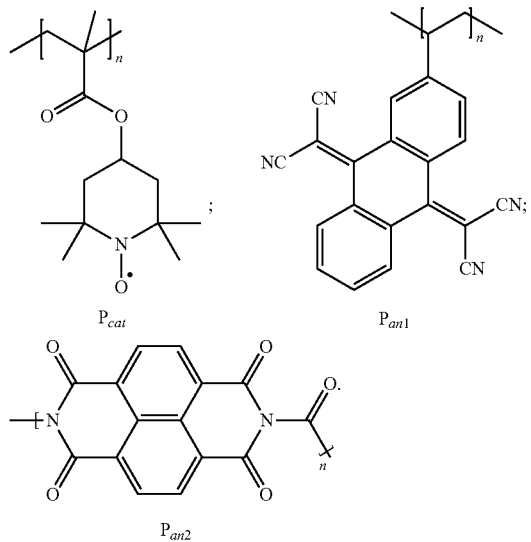

$P_{cat}$ was synthesized in accordance with WO 2018/046387 A1, adding triethylene glycol dimethacrylate in the synthesis for crosslinking.

$P_{an1}$ was synthesized in accordance with WO 2015/132374 A1.

$P_{an2}$ was synthesized in accordance with C. Chen, X. Zhao, H.-B. Li, F. Gan, J. Zhang, J. Dong, Q. Zhang, *Electrochim. Ada* 2017, 229, 387-395.

3. Production of the Electrodes

The production of the carbon pastes was conducted with laboratory dissolvers (VMA Getzmann). For this purpose, for Examples I1 to I3 and C1 to C4 and I9, a binder based on poly(vinylidene fluoride) (=PVDF) was dissolved in DMSO (dimethyl sulfoxide) and stirred by means of a laboratory dissolver for one hour. Subsequently, the respective polymer and, after a further hour, carbon (Super P) were added in a ratio of 5/60/35 (binder/polymer/Super P). After the addition of Super P, the dispersion was likewise stirred for one hour and then applied to the output conductor. The resultant electrode was dried in an air circulation drying cabinet.

For Examples I5 to I7 and C5 to C8, sodium carboxymethylcellulose (Na-CMC) was dissolved in water. Subsequently, the polymer and, after one hour, carbon (Super P) were added in a ratio of 10/60/30 (binder/polymer/Super P). After the addition of Super P, the dispersion was likewise stirred for one hour and then applied to the output conductor. The resultant electrode was dried in an air circulation drying cabinet. The proportion of the active material on the electrodes was determined on the basis of the masses of the dried electrodes. The discharge capacities reported in Table 1 were obtained by means of galvanostatic discharge.

4. Production of the Batteries

For production of fully organic test cells, the already described polymers $P_{cat}$, $P_{an1}$ and $P_{an2}$ were used as active electrode materials, using $P_{cat}$ as cathode and either $P_{an1}$ (Examples C1, C2, I1, I2) or $P_{an2}$ (Examples I3, I5 to I7, C3 to C8) as anode. In Examples I1 to I3 and C1 to C4, poly(vinylidene) fluoride (PVDF) was used as binder in the cathode and poly(vinylidene fluoride)-co-hexafluoropropylene (PVDF-HFP) in the anode. In Examples I5 to I7 and C5 to C8, sodium carboxymethylcellulose (Na-CMC) was used as binder.

5. Test Series: Polymerizations with Different Mixtures of Acrylates and Methacrylates The electrolyte system consists, in accordance with Scheme 1 shown below, of a mixture of monomers of the respective acrylate and methacrylate, a crosslinker, an ionic liquid, an initiator system and (semi)Metal oxide particles. The monomers are benzyl (meth)acrylate 1 and poly(ethylene glycol) methyl ether (meth)acrylate 2. These are polymerized as shown in the scheme below, conducting the polymerization on an electrode. The polymer is also crosslinked thereon. The $R^{1*}$, $R^{2*}$ radicals are either methyl or hydrogen. The variable v is an integer and is on average 9.

Scheme 1

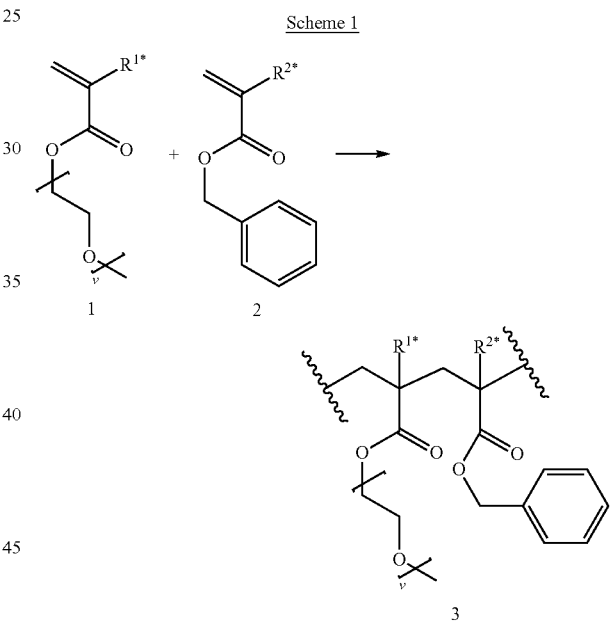

5.1 Comparative Example C1: Attempted Production of a Polymer Electrolyte Film with Methacrylate-Based Monomers 5.1.1 Benzyl methacrylate (compound 2 with $R^{2*}=CH_3$; 3.75 mmol, 660 mg, 635 µl), poly(ethylene glycol) methyl ether methacrylate (compound 1 with $R^{1*}=CH_3$; $M_n$: 500 g mol$^{-1}$; 1.25 mmol, 625 mg, 580 µl), triethylene glycol dimethacrylate (0.375 mmol, 107 mg, 98 µl), 1-ethyl-3-methylimidazolium bis(trifluoromethylsulfonyl)imide ($M_n$=391.31 g mol$^{-1}$; 9.5 mmol, 3.7 g, 2.45 ml; 1.90 molar equivalents based on the sum total of 1 and 2), Ivocein® (50 µmol, 20 mg), and fumed silica (7 nm; 256 mg) were mixed homogeneously and degassed under reduced pressure.

5.1.2 For production of the cells, suitable electrodes were punched out with the aid of an MIT Corporation Precision Disc Cutter (diameter 15 mm). A 500 µm-thick layer of the viscous paste was coated onto the P$_{cat}$ electrode being used as cathode, and the electrode was exposed with a UV lamp (UVACUBE 100, Hönle UV Technology) for 2.5 min. It was not possible to produce a stable film within this time.

5.2 Comparative Example C2: Production of a Polymer Electrolyte Film with Acrylate-Based Monomers and Use Thereof in a Fully Organic Battery 5.2.1 Benzyl acrylate (compound 2 with R$^{2*}$=H; 3.75 mmol, 610 mg, 575 µl), poly(ethylene glycol) methyl ether acrylate (compound 1 with R$^{1*}$=H; M$_n$: 480 g mol$^{-1}$; 1.25 mmol, 600 mg, 550 µl), poly(ethylene glycol) diacrylate (M$_n$: 250 g mol$^{-1}$; 0.25 mmol, 62.5 mg, 56 µl), 1-ethyl-3-methylimidazolium bis(trifluoromethylsulfonyl)imide (M$_n$=391.31 g mol$^{-1}$; 8.7 mmol, 3.42 g, 2.25 ml; 1.74 equivalents based on sum total of 1 and 2), Ivocerin® (50 µmol, 20 mg), and fumed silica (7 nm; 232 mg) were mixed homogeneously and degassed under reduced pressure.

5.2.2 For production of the cells, suitable electrodes were punched out with the aid of an MIT Corporation Precision Disc Cutter (diameter 15 mm). A 500 µm-thick layer of the viscous paste was coated onto the P$_{cat}$ electrode (PVDF binder) being used as cathode, and the electrode was exposed with a UV lamp (UVACUBE 100, Hönle UV Technology) for 2.5 min. The button cells (2032 type) were constructed under an argon atmosphere. The cathode thus coated with the polymer electrolyte was positioned on the base of the button cell. Subsequently positioned thereon was the P$_{an1}$ electrode (PVDF-HPF binder), which had been wetted beforehand with a few droplets of 1-ethyl-3-methylimidazolium bis(trifluoromethylsulfonyl)imide. A stainless steel weight (diameter-15.5 mm, thickness: 0.3 mm, MIT Corporation) and a stainless steel spring (diameter: 14.5 mm, thickness: 5 mm) were positioned thereon. The button cell was closed with the lid and sealed with an electrical press (MIT Corporation MSK 100D).

5.3 Inventive Example 11: Production of a Polymer Electrolyte Film with a Mixture of Acrylate- and Methacrylate-Based Monomers in a Ratio of 90/10, and Use Thereof in a Fully Organic Battery 5.3.1 Benzyl acrylate (compound 2 with R$^{2*}$=H; 3.375 mmol, 550 mg, 520 µl), poly(ethylene glycol) methyl ether acrylate (compound 1 with R$^{1*}$=H; M$_n$: 480 g mol$^{-1}$; 1.125 mmol, 540 mg, 495 µl), benzyl methacrylate (compound 2 with R$^{2*}$=CH$_3$; 0.375 mmol, 66 mg, 64 µl), poly(ethylene glycol) methyl ether methacrylate (compound 1 with R$^{1*}$=CH$_3$; M$_n$: 500 g mol$^{-1}$; 0.125 mmol, 62.5 mg, 58 µl), poly(ethylene glycol) diacrylate (M$_n$: 250 g mol$^{-1}$; 0.25 mmol, 62.5 mg, 56 µl), 1-ethyl-3-methylimidazolium bis(trifluoromethylsulfonyl)imide (M$_n$=391.31 g mol$^{-1}$; 8.81 mmol, 3.45 g, 2.27 ml; 1.76 molar equivalents based on sum total of 1 and 2), Ivocerin® (50 µmol, 20 mg), and fumed silica (7 nm; 237 mg) were mixed homogeneously and degassed under reduced pressure.

5.3.2 The production of the cells with the polymer electrolyte thus synthesized was effected as described in point 5.2.2 of Comparative Example C2.

5.4 Inventive Example 12: Production of a Polymer Electrolyte Film with a Mixture of Acrylate- and Methacrylate-Based Monomers in a Ratio of 80/20, and Use Thereof in a Fully Organic Battery 5.4.1 Benzyl acrylate (compound 2 with R$^{2*}$=H; 3 mmol, 487 mg, 460 µl), poly(ethylene glycol) methyl ether acrylate (compound 1 with R$^{1*}$=H; M$_n$: 480 g mol$^{-1}$; 1 mmol, 480 mg, 440 µl), benzyl methacrylate (compound 2 with R$^{2*}$=CH$_3$; 0.75 mmol, 132 mg, 127 µl), poly(ethylene glycol) methyl ether methacrylate (compound 1 with R$^{1*}$=CH$_3$; M$_n$: 500 g mol$^{-1}$; 0.25 mmol, 125 mg, 116 µl), poly(ethylene glycol) diacrylate (M$_n$: 250 g mol$^{-1}$; 0.25 mmol, 62.5 mg, 56 µl), 1-ethyl-3-methylimidazolium bis(trifluoromethylsulfonyl)imide (M$_n$=391.31 g mol$^{-1}$; 8.81 mmol, 3.45 g, 2.27 ml; 1.76 molar equivalents based on sum total of 1 and 2), Ivocerin® (50 µmol, 20 mg), and fumed silica (7 nm; 237 mg) were mixed homogeneously and degassed under reduced pressure.

5.4.2 The production of the cells with the polymer electrolyte thus synthesized was effected as described in point 5.2.2 of Comparative Example C2.

5.5 Comparative Example C3: Attempted Production of a Polymer Electrolyte Film with Methacrylate-Based Monomers 5.5.1 Benzyl methacrylate (compound 2 with R$^{2*}$=CH$_3$; 9.23 mmol, 1.63 g), poly(ethylene glycol) methyl ether methacrylate (compound 1 with R$^{1*}$=CH$_3$; M$_n$: 500 g mol$^{-1}$; 3.08 mmol, 1.54 g), tri(ethylene glycol) dimethacrylate (1.23 mmol, 0.35 g), 1-ethyl-3-methylimidazolium bis(trifluoromethylsulfonyl)imide (M$_n$=391.31 g mol$^{-1}$; 25.8 mmol, 10.1 g; 2.10 molar equivalents based on the sum total of 1 and 2), Ivocerin® (73 µmol, 29 mg), camphorquinone (73 µmol, 12 mg), ethyl dimethylaminobenzoate (109 µmol, 21 mg) and fumed silica (7 nm; 683 mg) were mixed homogeneously and degassed under reduced pressure.

5.5.2 A ~200 µm-thick layer of the viscous paste was coated onto the P$_{cat}$ electrode (PVDF binder) being used as cathode, and the electrode was exposed with a UV lamp (UVACUBE 100, Hönle UV Technology) for 2 min. It was not possible to obtain a stable film within this time.

5.6 Comparative Example C4: Production of a Polymer Electrolyte Film with Acrylate-Based Monomers and Use Thereof in a Fully Organic Battery 5.6.1 Benzyl acrylate (compound 2 with R$^2$=H; 10.36 mmol, 1.68 g), poly(ethylene glycol) methyl ether acrylate (compound 1 with R$^{1*}$=H; M$_n$: 480 g mol$^{-1}$; 3.45 mmol, 1.66 g), tri(ethylene glycol) diacrylate (0.69 mmol, 178 mg), 1-ethyl-3-methylimidazolium bis(trifluoromethylsulfonyl)imide (M$_n$=391.31 g mol$^{-1}$; 25.8 mmol, 10.1 g; 1.87 molar equivalents based on the sum total of 1 and 2), Ivocerin® (73 µmol, 29 mg), camphorquinone (73 µmol, 12 mg), ethyl dimethylaminobenzoate (109 µmol, 21 mg) and fumed silica (7 nm; 683 mg) were mixed homogeneously and degassed under reduced pressure.

5.6.2 A ~200 µm-thick layer of the viscous paste was coated onto the P$_{cat}$ electrode (PVDF binder) being used as cathode, and the electrode was exposed with a UV lamp (UVACUBE 100, Hönle UV Technology) for 2 min. The button cells (2032 type) were constructed under an argon atmosphere. The cathode thus coated with the polymer electrolyte was positioned on the base of the button cell. Subsequently positioned thereon was the P$_{an2}$ electrode (PVDF-HPF binder), which had been wetted beforehand with a few droplets of 1-ethyl-3-methylimidazolium bis (trifluoromethylsulfonyl)imide. A stainless steel weight (diameter: 15.5 mm, thickness: 0.3 mm, MIT Corporation) and a stainless steel spring (diameter: 14.5 mm, thickness: 5 mm) were positioned thereon. The button cell was closed with the lid and sealed with an electrical press (MIT Corporation MSK 100D).

5.7 Inventive Example 13: Production of a Polymer Electrolyte Film with a Mixture of Acrylate- and Methacrylate-Based Monomers in a Ratio of 90/10, and Use Thereof in a Fully Organic Battery 5.7.1 Benzyl acrylate (compound 2 with $R^2$=H; 9.32 mmol, 1.51 g), poly(ethylene glycol) methyl ether acrylate (compound 1 with $R^{1*}$=H; $M_n$: 480 g mol$^{-1}$; 3.11 mmol, 1.49 g), benzyl methacrylate (compound 2 with $R^{2*}$=CH$_3$; 1.04 mmol, 183 mg), poly(ethylene glycol) methyl ether methacrylate (compound 1 with $R^{1*}$=CH$_3$; $M_n$: 500 g mol$^{-1}$; 0.35 mmol, 173 mg), tri(ethylene glycol) diacrylate (0.69 mmol, 178 mg), 1-ethyl-3-methylimidazolium bis(trifluoromethylsulfonyl)imide ($M_n$=391.31 g mol$^{-1}$; 25.8 mmol, 10.1 g; 1.87 molar equivalents based on sum total of 1 and 2), Ivocerin® (73 µmol, 29 mg), camphorquinone (73 µmol, 12 mg), ethyl dimethylaminobenzoate (109 µmol, 21 mg) and fumed silica (7 nm; 683 mg) were mixed homogeneously and degassed under reduced pressure.

5.7.2 The production of the cells with the polymer electrolyte thus synthesized was effected as described in point 5.6.2 of Comparative Example C4.

5.8 Comparative Example C5: Repetition of Comparative Example C3

Comparative Example C3 was repeated except that, this time, a $P_{cat}$ electrode (with Na-CMC as binder) was used, and the same observation was made as in Comparative Example C3.

5.9 Comparative Example C6: Production of a Polymer Electrolyte Film with Acrylate-Based Monomers and Use Thereof in a Fully Organic Battery 5.9.1 Benzyl acrylate (compound 2 with $R^2$=H; 10.36 mmol, 1.68 g), poly(ethylene glycol) methyl ether acrylate (compound 1 with $R^{1*}$=H; $M_n$: 480 g mol$^{-1}$; 3.45 mmol, 1.66 g), tri(ethylene glycol) diacrylate (0.69 mmol, 178 mg), 1-ethyl-3-methylimidazolium bis(trifluoromethylsulfonyl)imide ($M_n$=391.31 g mol$^{-1}$; 25.8 mmol, 10.1 g; 1.87 molar equivalents based on the sum total of 1 and 2), Ivocerin® (73 µmol, 29 mg), camphorquinone (73 µmol, 12 mg), ethyl dimethylaminobenzoate (109 µmol, 21 mg) and fumed silica (7 nm; 683 mg) were mixed homogeneously and degassed under reduced pressure.

5.9.2 A ~200 µm-thick layer of the viscous paste was coated onto the $P_{cat}$ electrode (Na-CMC binder) being used as cathode, and the electrode was exposed with a UV lamp (UVACUBE 100, Hönle UV Technology) for 2 min. The button cells (2032 type) were constructed under an argon atmosphere. The cathode thus coated with the polymer electrolyte was positioned on the base of the button cell. Subsequently positioned thereon was the $P_{an2}$ electrode (Na-CMC binder), which had been wetted beforehand with a few droplets of 1-ethyl-3-methylimidazolium bis(trifluoromethylsulfonyl)imide. A stainless steel weight (diameter: 15.5 mm, thickness: 0.3 mm, MIT Corporation) and a stainless steel spring (diameter: 14.5 mm, thickness: 5 mm) were positioned thereon. The button cell was closed with the lid and sealed with an electrical press (MIT Corporation MSK-100D).

5.10 Inventive Example 15: Production of a Polymer Electrolyte Film with a Mixture of Acrylate- and Methacrylate-Based Monomers in a Ratio of 90/10, and Use Thereof in a Fully Organic Battery 5.10.1 Benzyl acrylate (compound 2 with $R^{2*}$=H; 9.32 mmol, 1.51 g), poly(ethylene glycol) methyl ether acrylate (compound 1 with $R^{1*}$=H; $M_n$: 480 g mol$^{-1}$; 3.11 mmol, 1.49 g), benzyl methacrylate (compound 2 with $R^{2*}$=CH$_3$; 1.04 mmol, 183 mg), poly(ethylene glycol) methyl ether methacrylate (compound 1 with $R^{1*}$=CH$_3$; $M_n$: 500 g mol$^{-1}$; 0.35 mmol, 173 mg), tri(ethylene glycol) diacrylate (0.69 mmol, 178 mg), 1-ethyl-3-methylimidazolium bis(trifluoromethylsulfonyl)imide ($M_n$=391.31 g mol$^{-1}$; 25.8 mmol, 10.1 g; 1.87 molar equivalents based on sum total of 1 and 2), Ivocerin® (73 µmol, 29 mg), camphorquinone (73 µmol, 12 mg), ethyl dimethylaminobenzoate (109 µmol, 21 mg) and fumed silica (7 nm; 683 mg) were mixed homogeneously and degassed under reduced pressure.

5.10.2 The production of the cells with the polymer electrolyte thus synthesized was effected as described in point 5.9.2 of Comparative Example C6.

5.11 Inventive Example 16: Production of a Polymer Electrolyte Film with a Mixture of Acrylate- and Methacrylate-Based Monomers in a Ratio of 80/20, and Use Thereof in a Fully Organic Battery 5.11.1 Benzyl acrylate (compound 2 with $R^{2*}$=H; 8.29 mmol, 1.34 g), poly(ethylene glycol) methyl ether acrylate (compound 1 with $R^{1*}$=H; $M_n$: 480 g mol$^{-1}$; 2.76 mmol, 1.33 g), benzyl methacrylate (compound 2 with $R^{2*}$=CH$_3$; 2.07 mmol, 365 mg), poly(ethylene glycol) methyl ether methacrylate (compound 1 with $R^{1*}$=CH$_3$; $M_n$: 500 g mol$^{-1}$; 0.69 mmol, 345 mg), tri(ethylene glycol) diacrylate (0.69 mmol, 178 mg), 1-ethyl-3-methylimidazolium bis(trifluoromethylsulfonyl)imide ($M_n$=391.31 g mol$^{-1}$; 25.8 mmol, 10.1 g; 1.87 molar equivalents based on sum total of 1 and 2), Ivocerin® (73 µmol, 29 mg), camphorquinone (73 µmol, 12 mg), ethyl dimethylaminobenzoate (109 µmol, 21 mg) and fumed silica (7 nm; 683 mg) were mixed homogeneously and degassed under reduced pressure.

5.11.2 The production of the cells with the polymer electrolyte thus synthesized was effected as described in point 5.9.2 of Comparative Example C6.

5.12 Comparative Example C$_7$: Attempted Production of a Polymer Electrolyte Film with Methacrylate-Based Monomers 5.12.1 Benzyl methacrylate (compound 2 with $R^{2*}$=CH; 9.23 mmol, 1.63 g), poly(ethylene glycol) methyl ether methacrylate (compound 1 with $R^{1*}$=CH$_3$; $M_n$: 500 g mol$^{-1}$; 3.08 mmol, 1.54 g), tri(ethylene glycol) dimethacrylate (1.23 mmol, 0.35 g), 1-ethyl-3-methylimidazolium trifluoromethanesulfonate ($M_n$=260.23 g mol$^{-1}$; 9.3 g, 35.7 mmol; 2.90 molar equivalents based on the sum total of 1 and 2), Ivocerin® (73 µmol, 29 mg), camphorquinone (73 µmol, 12 mg), ethyl dimethylaminobenzoate (109 µmol, 21 mg) and fumed silica (7 nm; 683 mg) were mixed homogeneously and degassed under reduced pressure.

5.12.2 A ~200 µm-thick layer of the viscous paste was coated onto the $P_{cat}$ electrode (Na-CMC binder) being used as cathode, and the electrode was exposed with a UV lamp (UVACUBE 100, Hönle UV Technology) for 2 min. It was not possible to obtain a stable film within this time.

5.13 Comparative Example C8: Production of a Polymer Electrolyte Film with Acrylate-Based Monomers and Use Thereof in a Fully Organic Battery 5.13.1 Benzyl acrylate (compound 2 with $R^{2*}$=H; 10.36 mmol, 1.68 g), poly(ethylene glycol) methyl ether acrylate (compound 1 with $R^{1*}$=H; $M_n$: 480 g mol$^{-1}$; 3.45 mmol, 1.66 g), tri(ethylene glycol) diacrylate (0.69 mmol, 178 mg), 1-ethyl-3-methylimidazolium trifluoromethanesulfonate ($M_n$=260.23 g mol$^{-1}$; 9.3 g, 35.7 mmol; 2.59 molar equivalents based on the sum total of 1 and 2), Ivocerin® (73 μmol, 29 mg), camphorquinone (73 μmol, 12 mg), ethyl dimethylaminobenzoate (109 μmol, 21 mg) and fumed silica (7 nm; 683 mg) were mixed homogeneously and degassed under reduced pressure.

5.13.2 A ~200 μm-thick layer of the viscous paste was coated onto the $P_{cat}$ electrode (Na-CMC binder) being used as cathode, and the electrode was exposed with a UV lamp (UVACUBE 100, Hönle UV Technology) for 2 min. The button cells (2032 type) were constructed under an argon atmosphere. The cathode thus coated with the polymer electrolyte was positioned on the base of the button cell. Subsequently positioned thereon was the $P_{an2}$ electrode (Na-CMC binder), which had been wetted beforehand with a few droplets of 1-ethyl-3-methylimidazolium trifluoromethanesulfonate. A stainless steel weight (diameter: 15.5 mm, thickness: 0.3 mm, MIT Corporation) and a stainless steel spring (diameter: 14.5 mm, thickness: 5 mm) were positioned thereon. The button cell was closed with the lid and sealed with an electrical press (MIT Corporation MSK 100D).

5.14 Inventive Example 17: Production of a Polymer Electrolyte Film with a Mixture of Acrylate- and Methacrylate-Based Monomers in a Ratio of 90/10, and Use Thereof in a Fully Organic Battery 5.14.1 Benzyl acrylate (compound 2 with $R^{2*}$=H; 9.32 mmol, 1.51 g), poly(ethylene glycol) methyl ether acrylate (compound 1 with $R^{1*}$=H; $M_n$: 480 g mol$^{-1}$; 3.11 mmol, 1.49 g), benzyl methacrylate (compound 2 with $R^{2*}$=CH$_3$; 1.04 mmol, 183 mg), poly(ethylene glycol) methyl ether methacrylate (compound 1 with $R^{1*}$=CH$_3$; $M_n$: 500 g mol$^{-1}$; 0.35 mmol, 173 mg), tri(ethylene glycol) diacrylate (0.69 mmol, 178 mg), 1-ethyl-3-methylimidazolium trifluoromethanesulfonate ($M_n$=260.23 g mol$^{-1}$; 9.3 g, 35.7 mmol; 2.58 molar equivalents based on sum total of 1 and 2), Ivocerin® (73 μmol, 29 mg), camphorquinone (73 μmol, 12 mg), ethyl dimethylaminobenzoate (109 μmol, 21 mg) and fumed silica (7 nm; 683 mg) were mixed homogeneously and degassed under reduced pressure.

5.14.2 The production of the cells with the polymer electrolyte thus synthesized was effected as described in point 5.13.2 of Comparative Example C8.

6. Results

The discharge capacities of the batteries constructed in the aforementioned examples were measured by means of galvanostatic discharge in a Maccor Battery Cycler and are reported in Table s below. The capacity of the electrode having the lower capacity (Pa) was used here as limiting capacity for the calculation of the charge/discharge current. The values reported in Table 1 correspond to the maximum specific discharge capacities of the respective limiting polymer [$^{A)}$ 1-ethyl-3-methylimidazolium bis(trifluoromethylsulfonyl)imide-based gel; $^{B)}$) 1-ethyl-3-methylimidazolium trifluoromethanesulfonate-based gel; charging rate=0.1 C means full charging within 600 minutes; charging rate=1 C means full charging within 60 minutes; charging rate=5 C means full charging within 12 minutes].

| Example/IL/ Electrode system | Binder system | Acrylate monomers [mol %] | Methacrylate monomers [mol %] | Maximum capacity 0.1 C [mAh g$^{-1}$] | Maximum capacity 1 C [mAh g$^{-1}$] | Maximum capacity 5 C [mAh g$^{-1}$] |
|---|---|---|---|---|---|---|
| C1 $^{A)}$ ($P_{CAT}/P_{AN1}$) | PVDF/ PVDF-HFP | 0 | 100 | Not measurable, since no stable film obtainable within 2.5 min | | |
| C2 $^{A)}$ ($P_{CAT}/P_{AN1}$) | PVDF/ PVDF-HFP | 100 | 0 | 21 | 15 | 9 |
| I1 $^{A)}$ ($P_{CAT}/P_{AN1}$) | PVDF/ PVDF-HFP | 90 | 10 | 34 | 38 | 28 |
| I2 $^{A)}$ ($P_{CAT}/P_{AN1}$) | PVDF/ PVDF-HFP | 80 | 20 | 39 | 41 | 24 |
| C3 $^{A)}$ ($P_{CAT}/P_{AN2}$) | PVDF/ PVDF-HFP | 0 | 100 | Not measurable, since no stable film obtainable within 2 min | | |
| C4 $^{A)}$ ($P_{CAT}/P_{AN2}$) | PVDF/ PVDF-HFP | 100 | 0 | 38 | 21 | 18 |
| I3 $^{A)}$ ($P_{CAT}/P_{AN2}$) | PVDF/ PVDF-HFP | 90 | 10 | 72 | 40 | 20 |
| C5 $^{A)}$ ($P_{CAT}/P_{AN2}$) | Na-CMC | 0 | 100 | Not measurable, since no stable film obtainable within 2 min | | |
| C6 $^{A)}$ ($P_{CAT}/P_{AN2}$) | Na-CMC | 100 | 0 | 2 | 2 | 2 |
| I5 $^{A)}$ ($P_{CAT}/P_{AN2}$) | Na-CMC | 90 | 10 | 42 | 32 | 22 |

-continued

| Example/IL/ Electrode system | Binder system | Acrylate monomers [mol %] | Methacrylate monomers [mol %] | Maximum capacity 0.1 C [mAh g$^{-1}$] | Maximum capacity 1 C [mAh g$^{-1}$] | Maximum capacity 5 C [mAh g$^{-1}$] |
|---|---|---|---|---|---|---|
| I6 [A)] ($P_{CAT}/P_{AN2}$) | Na-CMC | 80 | 20 | 45 | 38 | 24 |
| C7 [B)] ($P_{CAT}/P_{AN2}$) | Na-CMC | 0 | 100 | Not measurable, since no stable film obtainable within 2 min | | |
| C8 [B)] ($P_{CAT}/P_{AN2}$) | Na-CMC | 100 | 0 | 4 | 4 | 4 |
| I7 [B)] ($P_{CAT}/P_{AN2}$) | Na-CMC | 90 | 10 | 17 | 9 | 5 |

7. Conclusions

The following can be seen from the results in Table 1:
1) A polymer electrolyte based solely on methacrylate monomers does not polymerize quickly enough.
2) The discharge capacities observed with the electrolyte systems according to the invention were well above those observed in the comparative examples (see Examples I1, I2 with C1, C2; Example I3 with C3, C4; Examples I5, I6 with C5, C6; Example I7 with Examples C7, C8). This is attributed to the fact that the use of acrylate monomers leads to batteries having lower discharge capacity and only the use of mixtures of methacrylate monomers and acrylate monomers in the polymerization to give the polymer electrolyte $P_{ele}$ assures higher discharge capacity. This is observed for various electrolytes.
3) The examples also showed that the increase in the discharge capacities is also maintained at the different C rates 0.1, 1 or 5 C.
4) This shows that a higher charge capacity for the organic batteries is achieved with the inventive polymer electrolyte $P_{ele}$.

The invention claimed is:
1. A process for producing a charge storage unit, the process comprising:
(a) polymerizing a mixture M comprising at least one compound of the formula (I), at least one compound of the formula (II):

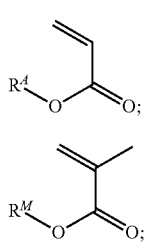

(I)

(II)

wherein $R^A$, $R^M$ are independently selected from the group consisting of hydrogen, an alkyl group, a (poly)ether group, an aryl group, an aralkyl group, an alkaryl group, and a haloalkyl group,
and at least one ionic liquid IL, to obtain a polymer electrolyte $P_{ele}$, and
(b) disposing the polymer electrolyte $P_{ele}$ obtained in (a) between two electrodes $E_{cat}$ and $E_{an}$, wherein $E_{cat}$ and $E_{an}$ each independently comprise at least one conductivity additive L and at least one organic redox-active polymer $P_{redox}$ selected from the group consisting of polyimides and polymers comprising m units of the general formula (III):

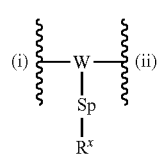

(III)

wherein m is an integer $\geq 4$, W is a repeat unit, Sp is an organic spacer and $R^X$ is an organic redox-active group, wherein the bond identified by (i) in a unit of the formula (III) binds to the bond identified by (ii) in an adjacent unit of the formula (III).

2. The process according to claim 1, wherein, in (a), a molar ratio of all compounds of formula (I) included in the mixture M to all compounds of the formula (II) included in the mixture M is in the range of 99:1 to 1:99.

3. The process according to claim 1, wherein the ionic liquid IL has a structure $Q^+A^-$ in which $Q^+$ is a cation selected from the group consisting of the structures (Q1), (Q2), (Q3), (Q4), and (Q5)

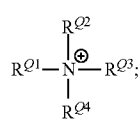

(Q1)

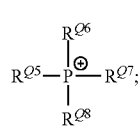

(Q2)

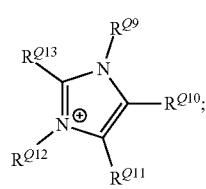

(Q3)

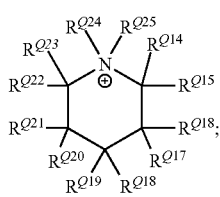
(Q4)

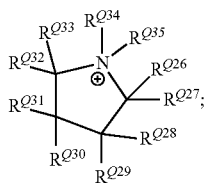
(Q5)

wherein $R^{Q1}, R^{Q2}, R^{Q3}, R^{Q4}, R^{Q5}, R^{Q6}, R^{Q7}, R^{Q8}$ are each independently selected from the group consisting of an alkyl group, a haloalkyl group, and a cycloalkyl group, wherein $R^{Q9}, R^{Q10}, R^{Q11}, R^{Q12}, R^{Q13}, R^{Q14}, R^{Q15}, R^{Q16}, R^{Q17}, R^{Q18}, R^{Q19}, R^{Q20}, R^{Q21}, R^{Q22}, R^{Q23}, R^{Q24}, R^{Q25}, R^{Q26}, R^{Q27}, R^{Q28}, R^{Q29}, R^{Q30}, R^{Q31}, R^{Q32}, R^{Q33}, R^{Q34}, R^{Q35}$ are each independently selected from the group consisting of hydrogen, an alkyl group, a (poly)ether group, a haloalkyl group, and a cycloalkyl group, and in which $A^-$ is an anion.

4. The process according to claim 1, wherein a total molar amount of all ionic liquids IL included in the mixture M in (a), based on a total molar amount of all compounds of the formulae (I) and (II) included in the mixture M, is ≥0.1 molar equivalent.

5. The process according to claim 1, wherein (a) is conducted on a surface of at least one of the electrodes $E_{cat}$ and $E_{an}$.

6. The process according to claim 1, wherein the polymer $P_{redox}$ is a polymer comprising m units of the general formula (III) in which $R^X$ is selected from the group consisting of compounds of the general formulae (III-A), (III-B), (III-C), and (III-D), where

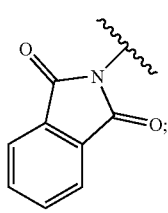
(III-A)

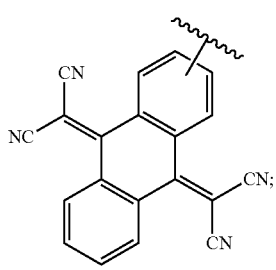
(III-B)

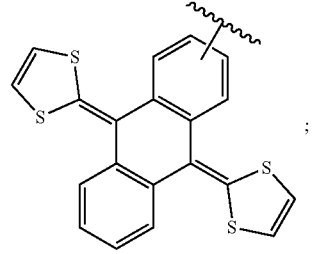
(III-C)

(III-D)

and wherein, in the structures (III-A), (III-B) and (III-C), at least one aromatic carbon atom may be substituted by a group selected from the group consisting of an alkyl group, a halogen group, an alkoxy group, and a hydroxyl group.

7. The process according to claim 1, wherein the polymer $P_{redox}$ is a polyimide selected from the group consisting of the structures (IV-1), (IV-2), (IV-3), (IV-4), (IV-5), (IV-6), and (IV-7):

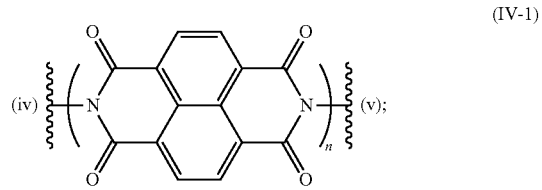
(IV-1)

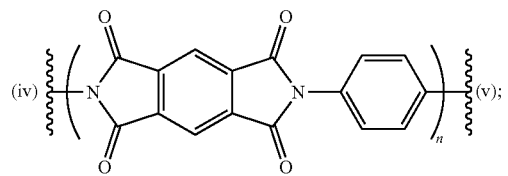
(IV-2)

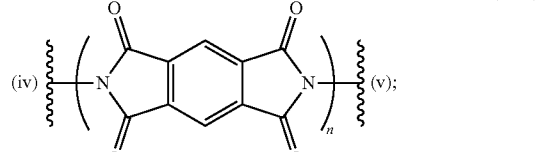
(IV-3)

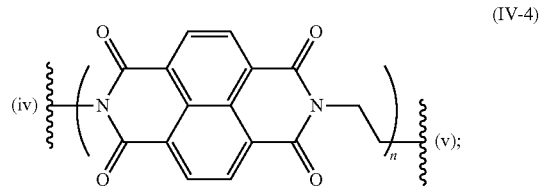
(IV-4)

-continued

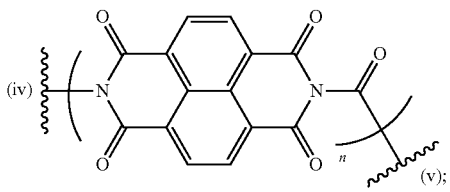
(IV-5)

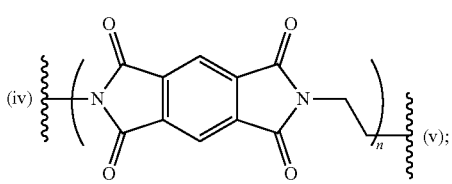
(IV-6)

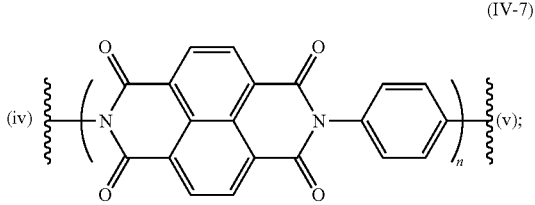
(IV-7)

wherein n in each case is an integer ≥4 and the bond identified by (iv) in the structures (IV-1), (IV-2), (IV-3), (IV-4), (IV-5), (IV-6), (IV-7) binds in each case to the bond identified by (v), and wherein, in the structures (IV-1), (IV-2), (IV-3), (IV-4), (IV-5), (IV-6), (IV-7), at least one aromatic carbon atom may be substituted by a group selected from the group consisting of alkyl, halogen, alkoxy, and OH.

8. The process according to claim 1, wherein the W radical in the structure (III) is selected from the group consisting of the structures (W1), (W2), and (W3):

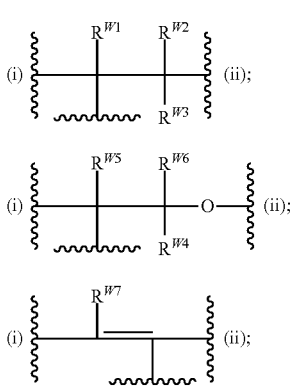

(W1)

(W2)

(W3)

wherein the bond identified by (i) in a unit of the formula (W1), (W2), or (W3) binds in each case to the bond identified by (ii) in an adjacent unit of the formula (W1), (W2) or (W3), wherein the bond identified by (iii) in each case indicates the bond to Sp, and wherein $R^{W1}$, $R^{W2}$, $R^{W3}$, $R^{W4}$, $R^{W5}$, $R^{W6}$, $R^{W7}$ are independently selected from the group consisting of hydrogen, an alkyl group, a haloalkyl group, and —$COOR^{W8}$ wherein $R^{W8}$=H or alkyl, and wherein Sp in the structure (III) is selected from the group consisting of a direct bond, (Sp1), and (Sp2):

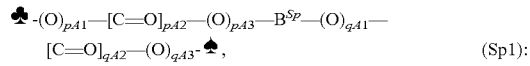
(Sp1):

(Sp2):

wherein pA1, pA2, pA3 in each case is 0 or 1, excluding the case that pA2=0 and pA1=pA3=1, wherein qA1, qA2, qA3 in each case is 0 or 1, excluding the case that qA2=0 and qA1=qA3=1, wherein qA4, qA5, qA6 in each case is 0 or 1, where at least one of qA4, qA5, qA6=1 and excluding the case that qA5=0 and qA4=qA6=1, wherein $B^{Sp}$ is selected from the group consisting of a divalent (hetero)aromatic radical, and a divalent aliphatic radical, optionally substituted by at least one group selected from the group consisting of a nitro group, —$NH_2$, —CN, —SH, —OH, and halogen; and optionally having at least one group selected from the group consisting of an ether, a thioether, an amino ether, a carbonyl group, a carboxylic ester, a carboxamide group, a sulfonic ester, and a phosphoric ester, and where in the cases in which Sp binds to a non-carbon atom in the $R^X$ radical, the structure (Sp1) is subject to the additional condition qA3=0, qA2=1, and qA1=1; or qA3=qA2=qA1=0; or qA3=0, qA2=1, and qA1=0, and the structure (Sp2) is subject to the additional condition that qA6=0, qA5=1, and qA4=1; or qA6=0, qA5=1, and qA4=0, and wherein ♠ denotes the bond pointing toward $R^X$, and wherein ♣ denotes the bond pointing toward W.

9. The process according to claim 1, wherein the polymer $P_{redox}$ comprises t repeat units joined to one another, selected from the group consisting of the structures P1, P2, and P3:

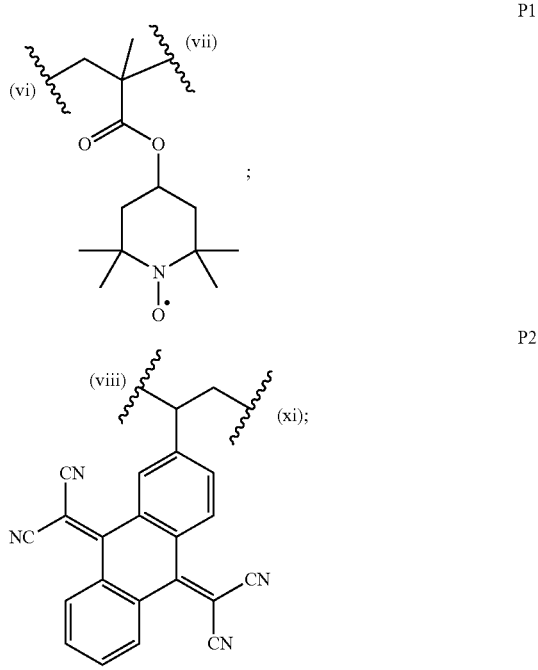

-continued

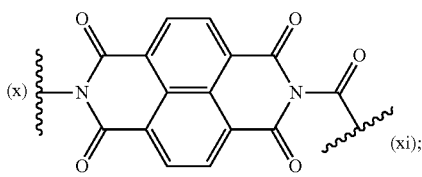

wherein t is an integer ≥4, and
the bond identified by (vi) in a unit of the formula P1 binds to the bond identified by (vii) in an adjacent unit of the formula P1, and
the bond identified by (viii) in a unit of the formula P2 binds to the bond identified by (ix) in an adjacent unit of the formula P2, and
the bond identified by (x) in a unit of the formula P3 binds to the bond identified by (xi) in an adjacent unit of the formula P3.

10. The process according to claim 1, wherein the conductivity additive L is selected from the group consisting of carbon materials, electrically conductive polymers, metals, semimetals, metal compounds, and semimetal compounds.

11. A charge storage unit obtainable by the process according to claim 1.

12. A charge storage unit, comprising a polymer electrolyte $P_{ele}$ disposed between two electrodes $E_{cat}$ and $E_{an}$, wherein $E_{cat}$ and $E_{an}$ each independently comprise at least one conductivity additive L and at least one organic redox-active polymer $P_{redox}$ selected from the group consisting of polyimides and polymers comprising m units of the general formula (III):

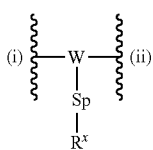

(III)

wherein m is an integer ≥4, W is a repeat unit, Sp is an organic spacer and $R^X$ is an organic redox-active group, wherein the bond identified by (i) in a unit of the formula (III) binds to the bond identified by (ii) in an adjacent unit of the formula (III),
wherein
the polymer electrolyte $P_{ele}$ is obtained by polymerizing a mixture M comprising at least one compound of the formula (I), at least one compound of the formula (II):

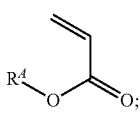

(I)

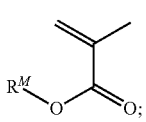

(II)

wherein $R^A$, $R^M$ are independently selected from the group consisting of hydrogen, an alkyl group, a (poly)ether group, an aryl group, an aralkyl group, an alkaryl group, and a haloalkyl group,
and at least one ionic liquid IL.

13. The charge storage unit according to claim 12, wherein a molar ratio of all compounds of formula (I) included in the mixture M to all compounds of the formula (II) included in the mixture M is in the range of 99:1 to 1:99.

14. The charge storage unit according to claim 12, wherein the ionic liquid IL has a structure $Q^+A^-$ in which $Q^+$ is a cation selected from the group consisting of the structures (Q1), (Q2), (Q3), (Q4), and (Q5):

(Q1)

(Q2)

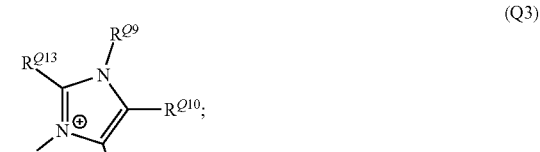

(Q3)

(Q4)

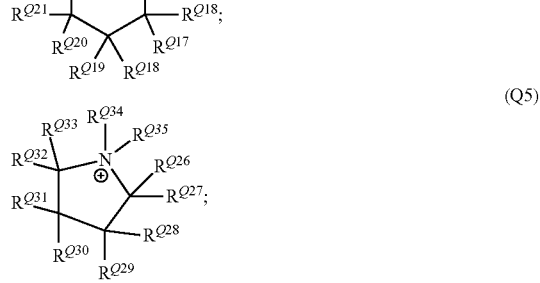

(Q5)

wherein $R^{Q1}$, $R^{Q2}$, $R^{Q3}$, $R^{Q4}$, $R^{Q5}$, $R^{Q6}$, $R^{Q7}$, $R^{Q8}$ are each independently selected from the group consisting of an alkyl group, a haloalkyl group, and a cycloalkyl group, wherein $R^{Q9}$, $R^{Q10}$, $R^{Q11}$, $R^{Q12}$, $R^{Q13}$, $R^{Q14}$, $R^{Q15}$, $R^{Q16}$, $R^{Q17}$, $R^{Q18}$, $R^{Q19}$, $R^{Q20}$, $R^{Q21}$, $R^{Q22}$, $R^{Q23}$, $R^{Q24}$, $R^{Q25}$, $R^{Q26}$, $R^{Q27}$, $R^{Q28}$, $R^{Q29}$, $R^{Q30}$, $R^{Q31}$, $R^{Q32}$, $R^{Q33}$, $R^{Q34}$, $R^{Q35}$ are each independently selected from the group consisting of hydrogen, an alkyl group, a (poly)ether group, a haloalkyl group, and a cycloalkyl group, and in which $A^-$ is an anion.

15. The charge storage unit according to claim 12, wherein a total molar amount of all ionic liquids IL included in the mixture M, based on a total molar amount of all compounds of the formulae (I) and (II) included in the mixture M, is ≥0.1 molar equivalents.

16. The charge storage unit according to claim 12, wherein the polymer $P_{redox}$ is a polymer comprising m units of the general formula (III) in which $R^X$ is selected from the group consisting of compounds of the general formulae (III-A), (III-B), (III-C), and (III-D), where (III-A)

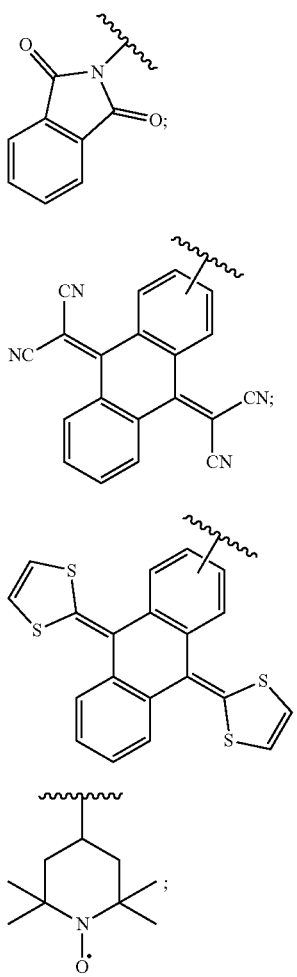

(III-B)

(III-C)

(III-D)

and wherein, in the structures (III-A), (III-B) and (III-C), at least one aromatic carbon atom may be substituted by a group selected from the group consisting of alkyl, halogen, alkoxy, and OH.

17. The charge storage unit according to claim 12, wherein the polymer $P_{redox}$ is a polyimide selected from the group consisting of the structures (IV-1), (IV-2), (IV-3), (IV-4), (IV-5), (IV-6), and (IV-7):

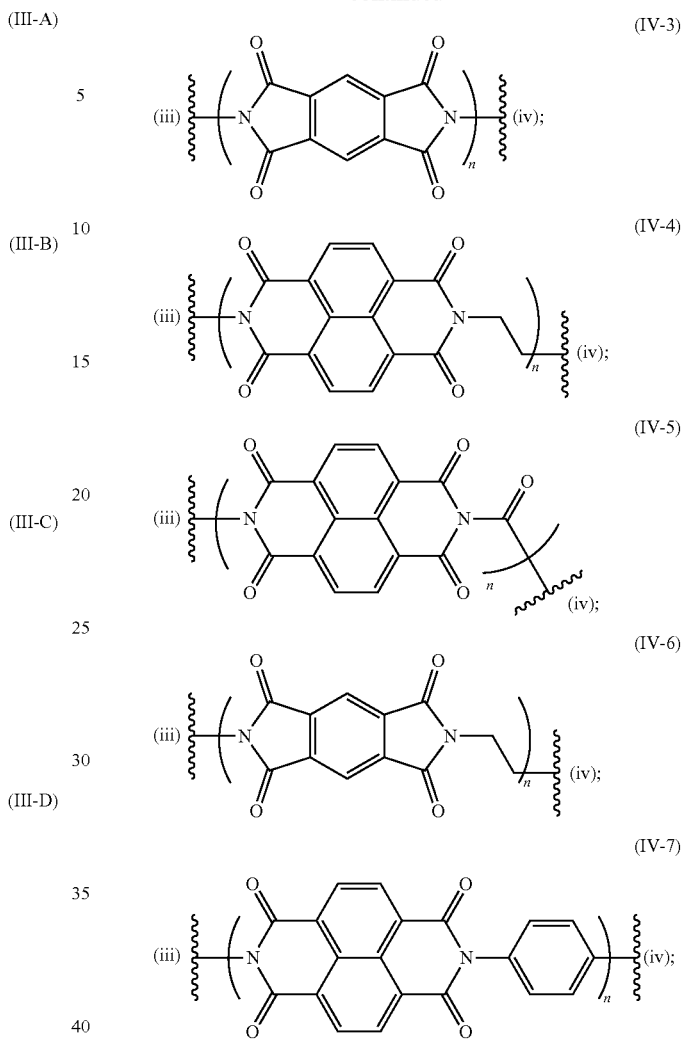

(IV-1)
(IV-2)
(IV-3)
(IV-4)
(IV-5)
(IV-6)
(IV-7)

wherein n in each case is an integer ≥4 and the bond identified by (iii) in the structures (IV-1), (IV-2), (IV-3), (IV-4), (IV-5), (IV-6), (IV-7) binds in each case to the bond identified by (iv), and wherein, in the structures (IV-1), (IV-2), (IV-3), (IV-4), (IV-5), (IV-6), (IV-7), at least one aromatic carbon atom may be substituted by a group selected from the group consisting of alkyl, halogen, alkoxy, and OH.

18. The charge storage unit according to claim 12, wherein the W radical in the structure (III) is selected from the group consisting of the structures (W1), (W2), and (W3):

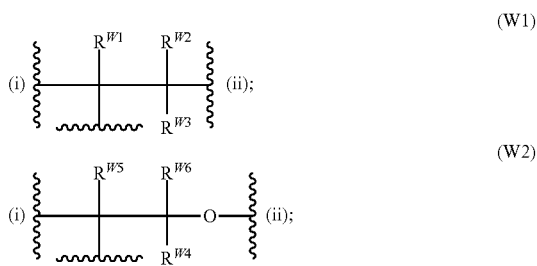

(W1)
(W2)

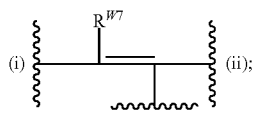
(W3)

wherein the bond identified by (i) in a unit of the formula (W1), (W2), or (W3) binds in each case to the bond identified by (ii) in an adjacent unit of the formula (W1), (W2) or (W3), wherein the bond identified by (iii) in each case indicates the bond to Sp, and wherein $R^{W1}$, $R^{W2}$, $R^{W3}$, $R^{W4}$, $R^{W5}$, $R^{W6}$, $R^{W7}$ are independently selected from the group consisting of hydrogen, an alkyl group, a haloalkyl group, and —$COOR^{W8}$ wherein $R^{W8}$=H or alkyl, and wherein Sp in the structure (III) is selected from the group consisting of a direct bond, (Sp1), and (Sp2):

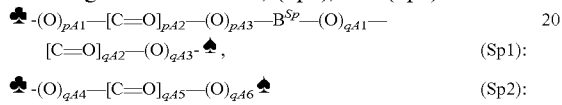

♠-$(O)_{pA1}$—$[C=O]_{pA2}$—$(O)_{pA3}$—$B^{Sp}$—$(O)_{qA1}$—
$[C=O]_{qA2}$—$(O)_{qA3}$-♣, (Sp1):

♠-$(O)_{qA4}$—$[C=O]_{qA5}$—$(O)_{qA6}$♣ (Sp2):

wherein pA1, pA2, pA3 in each case is 0 or 1, excluding the case that pA2=0 and pA1=pA3=1, wherein qA1, qA2, qA3 in each case is 0 or 1, excluding the case that qA2=0 and qA1=qA3=1, wherein qA4, qA5, qA6 in each case is 0 or 1, where at least one of qA4, qA5, qA6=1 and excluding the case that qA5=0 and qA4=qA6=1, wherein $B^{Sp}$ is selected from the group consisting of
a divalent (hetero)aromatic radical, and
a divalent aliphatic radical, optionally substituted by at least one group selected from the group consisting of a nitro group, —$NH_2$, —CN, —SH, —OH, and halogen; and optionally having at least one group selected from the group consisting of an ether, a thioether, an amino ether, a carbonyl group, a carboxylic ester, a carboxamide group, a sulfonic ester, and a phosphoric ester, and where in the cases in which Sp binds to a non-carbon atom in the $R^X$ radical, the structure (Sp1) is subject to the additional condition qA3=0, qA2=1, and qA1=1; or qA3=qA2=qA1=0; or qA3=0, qA2=1, and qA1=0, and the structure (Sp2) is subject to the additional condition that qA6=0, qA5=1, and qA4=1; or qA6=0, qA5=1, and qA4=0, and wherein ♠ denotes the bond pointing toward $R^X$, and
wherein ♣ denotes the bond pointing toward W.

19. The charge storage unit according to claim 12, wherein the polymer $P_{redox}$ comprises t repeat units joined to one another, selected from the group consisting of the structures P1, P2, and P3:

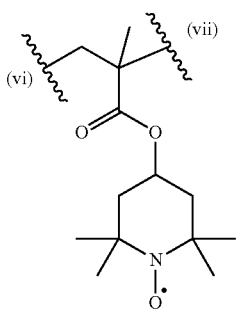
P1

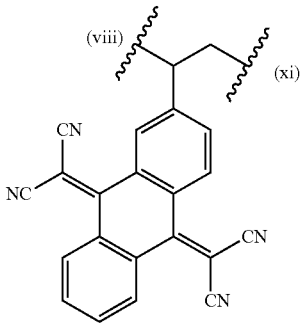
P2

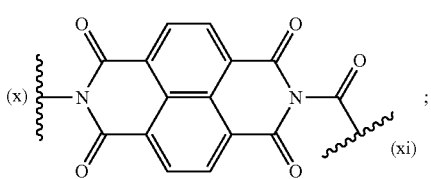
P3 wherein t is an integer ≥4, and the bond identified by (vi) in a unit of the formula P1 binds to the bond identified by (vii) in an adjacent unit of the formula P1, and the bond identified by (viii) in a unit of the formula P2 binds to the bond identified by (ix) in an adjacent unit of the formula P2, and the bond identified by (x) in a unit of the formula P3 binds to the bond identified by (xi) in an adjacent unit of the formula P3.

20. The charge storage unit according to claim 12, wherein the conductivity additive L is selected from the group consisting of carbon materials, electrically conductive polymers, metals, semimetals, metal compounds, and semimetal compounds.

* * * * *